United States Patent
Swinkels et al.

(10) Patent No.: US 10,715,888 B2
(45) Date of Patent: Jul. 14, 2020

(54) SYSTEMS AND METHODS FOR MANAGING EXCESS OPTICAL CAPACITY AND MARGIN IN OPTICAL NETWORKS

(71) Applicant: Ciena Corporation, Hanover, MD (US)

(72) Inventors: Gerard L. Swinkels, Ottawa (CA); James Harley, Nepean (CA); David W. Boertjes, Nepean (CA); David Miedema, Ottawa (CA); Michel Belanger, Montreal (CA); Paul A. Littlewood, Johns Creek, GA (US); John P. Mateosky, West River, MD (US); Michael Y. Frankel, Baltimore, MD (US); Kevin S. Meagher, Bowie, MD (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/356,429

(22) Filed: Mar. 18, 2019

(65) Prior Publication Data
US 2019/0215586 A1    Jul. 11, 2019

Related U.S. Application Data

(63) Continuation of application No. 14/886,584, filed on Oct. 19, 2015, now Pat. No. 10,257,596, and a (Continued)

(51) Int. Cl.
*H04Q 11/00* (2006.01)
*H04L 12/24* (2006.01)
*H04B 10/516* (2013.01)

(52) U.S. Cl.
CPC ....... *H04Q 11/0062* (2013.01); *H04B 10/516* (2013.01); *H04L 41/04* (2013.01);
(Continued)

(58) Field of Classification Search
CPC combination set(s) only.
See application file for complete search history.

(56) References Cited

U.S. PATENT DOCUMENTS

| 5,363,408 A | 11/1994 | Paik et al. |
| 5,541,955 A | 7/1996 | Jacobsmeyer |

(Continued)

OTHER PUBLICATIONS

Cina Corporation, "Enabling a Bigger and Smarter Network With Ciena's Wavelogic 3", Application Note, AN085, Aug. 2013.
(Continued)

*Primary Examiner* — Omar S Ismail
(74) *Attorney, Agent, or Firm* — Clements Bernard Walker; Christopher L. Bernard; Lawrence A. Baratta, Jr.

(57) ABSTRACT

A method, a controller, and an optical network element are configured to perform steps of monitoring one or more optical links each formed by optical transceivers which are configured to provide variable capacity via a plurality of modulation formats; based on the monitoring, causing corresponding optical transceivers for the one or more optical links to operate at a first modulation format different from a second modulation format providing excess capacity; and mapping the excess capacity to bandwidth useable by one or more services managed by the one or more of the management system, the management plane, and the control plane.

20 Claims, 22 Drawing Sheets

Related U.S. Application Data continuation-in-part of application No. 14/534,657, filed on Nov. 6, 2014, now Pat. No. 9,455,788, and a continuation-in-part of application No. 14/176,908, filed on Feb. 10, 2014, now Pat. No. 9,258,190, and a continuation-in-part of application No. 13/372,013, filed on Feb. 13, 2012, now Pat. No. 9,374,166.

(52) U.S. Cl.
CPC ..... *H04L 41/0896* (2013.01); *H04Q 11/0003* (2013.01); *H04L 41/0663* (2013.01); *H04L 41/0893* (2013.01); *H04L 41/5096* (2013.01); *H04Q 2011/0064* (2013.01); *H04Q 2011/0081* (2013.01); *H04Q 2011/0083* (2013.01); *H04Q 2011/0084* (2013.01); *H04Q 2011/0086* (2013.01); *H04Q 2011/0088* (2013.01)

(56) References Cited

U.S. PATENT DOCUMENTS

| | | |
|---|---|---|
| 5,764,699 A | 6/1998 | Needham et al. |
| 5,909,469 A | 6/1999 | Frodigh et al. |
| 5,946,104 A | 8/1999 | Yoshida |
| 6,459,832 B1 | 10/2002 | Smith et al. |
| 6,496,297 B1 | 12/2002 | Frankel et al. |
| 6,795,394 B1 | 9/2004 | Swinkels et al. |
| 6,829,251 B2 | 12/2004 | Duvaut et al. |
| 6,904,082 B2 | 6/2005 | Jones |
| 7,016,296 B2 | 3/2006 | Hartman |
| 7,020,073 B2 | 3/2006 | Kadoua et al. |
| 7,099,597 B2 | 8/2006 | Saunders et al. |
| 7,308,052 B2 | 12/2007 | Cheng et al. |
| 7,391,728 B2 | 6/2008 | Natarajan et al. |
| 7,415,208 B1 | 8/2008 | Haggans et al. |
| 7,474,903 B2 | 1/2009 | Kim et al. |
| 7,542,514 B2 | 6/2009 | Song et al. |
| 7,574,134 B2 | 8/2009 | Frankel |
| 7,602,814 B2 | 10/2009 | Meagher et al. |
| 7,609,757 B2 | 10/2009 | Jones |
| 7,634,194 B2 | 12/2009 | Frankel et al. |
| 7,764,707 B2 | 7/2010 | Li |
| 7,792,044 B2 | 9/2010 | Holness et al. |
| 7,817,656 B1 | 10/2010 | Deng et al. |
| 7,826,752 B1 | 11/2010 | Zanoni et al. |
| 7,962,049 B2 | 6/2011 | Mateosky et al. |
| 8,005,375 B2 | 8/2011 | Frankel |
| 8,009,692 B2 | 8/2011 | Basso et al. |
| 8,009,985 B1 | 8/2011 | Roberts et al. |
| 8,023,396 B2 | 9/2011 | Hartman |
| 8,045,855 B2 | 10/2011 | Frankel |
| 8,259,861 B2 | 9/2012 | Kuhtz |
| 8,295,175 B2 | 10/2012 | Ellis et al. |
| 8,364,036 B2 | 1/2013 | Boertjes et al. |
| 8,402,121 B2 | 3/2013 | Skalecki et al. |
| 8,467,687 B2 | 6/2013 | Sasaki et al. |
| 8,509,621 B2 | 8/2013 | Boertjes et al. |
| 8,532,498 B2 | 9/2013 | Shpantzer |
| 8,553,551 B2 | 10/2013 | Spector |
| 8,553,707 B2 | 10/2013 | Swinkels et al. |
| 8,707,137 B2 | 4/2014 | Arye |
| 2002/0018269 A1* | 2/2002 | Chaudhuri .......... H04J 14/0227 398/166 |
| 2002/0109879 A1* | 8/2002 | Wing So ................ H04J 7/00 398/58 |
| 2002/0159121 A1 | 10/2002 | Spickermann |
| 2002/0186432 A1 | 12/2002 | Roorda et al. |
| 2002/0191250 A1* | 12/2002 | Graves ............... H04Q 11/0066 398/82 |
| 2003/0091004 A1 | 5/2003 | Tang |
| 2003/0231706 A1 | 12/2003 | Hwang |
| 2004/0107382 A1* | 6/2004 | Doverspike ......... H04L 41/0663 714/4.1 |
| 2004/0156644 A1 | 8/2004 | Fuse et al. |
| 2004/0184398 A1 | 9/2004 | Walton et al. |
| 2004/0247314 A1 | 12/2004 | Kawarai |
| 2005/0036444 A1 | 2/2005 | Park et al. |
| 2005/0047517 A1 | 3/2005 | Georgios et al. |
| 2006/0029398 A1 | 2/2006 | Liu et al. |
| 2006/0129525 A1 | 6/2006 | Rijpkema |
| 2007/0110002 A1 | 5/2007 | Yang |
| 2007/0166032 A1 | 7/2007 | Frankel |
| 2007/0230594 A1 | 10/2007 | Mo et al. |
| 2007/0253388 A1 | 11/2007 | Pietraski |
| 2007/0268814 A1 | 11/2007 | Li |
| 2008/0025728 A1 | 1/2008 | Shpantzer et al. |
| 2008/0037982 A1* | 2/2008 | Niven-Jenkins .... H04J 14/0227 398/25 |
| 2008/0170853 A1* | 7/2008 | Rakib ................ H04L 12/2801 398/26 |
| 2008/0225381 A1 | 9/2008 | Heffner et al. |
| 2008/0259968 A1* | 10/2008 | Forghieri ........... H04J 14/0227 370/509 |
| 2009/0003301 A1 | 1/2009 | Reial et al. |
| 2009/0022497 A1 | 1/2009 | Mateosky et al. |
| 2009/0028182 A1* | 1/2009 | Brooks ............... H04L 41/0896 370/466 |
| 2009/0042562 A1* | 2/2009 | Treesh ................. H04B 7/2041 455/428 |
| 2009/0103931 A1 | 4/2009 | Grigoryan et al. |
| 2009/0147896 A1 | 6/2009 | Frankel et al. |
| 2009/0161543 A1* | 6/2009 | Beadle ................ H04L 41/0896 370/232 |
| 2009/0168922 A1 | 7/2009 | Malladi et al. |
| 2009/0169204 A1 | 7/2009 | Meagher et al. |
| 2009/0169208 A1 | 7/2009 | Grigoryan et al. |
| 2009/0169217 A1 | 7/2009 | Meagher et al. |
| 2009/0196602 A1* | 8/2009 | Saunders ........... H04B 10/5053 398/26 |
| 2009/0202240 A1* | 8/2009 | Carroll ................ H04J 14/0227 398/45 |
| 2009/0205007 A1 | 8/2009 | Woodward |
| 2009/0214212 A1 | 8/2009 | Vorbeck et al. |
| 2010/0008617 A1 | 1/2010 | Marrakchi El Fellah et al. |
| 2010/0014500 A1 | 1/2010 | Lee |
| 2010/0021166 A1 | 1/2010 | Way |
| 2010/0054144 A1 | 3/2010 | Choi et al. |
| 2010/0142943 A1 | 6/2010 | Frankel et al. |
| 2010/0329686 A1 | 12/2010 | Frankel |
| 2011/0013911 A1 | 1/2011 | Alexander et al. |
| 2011/0033195 A1 | 2/2011 | Frankel |
| 2011/0122787 A1 | 5/2011 | Wang |
| 2011/0135305 A1* | 6/2011 | Barnard ............... H04B 10/572 398/49 |
| 2011/0176815 A1 | 7/2011 | Frankel et al. |
| 2011/0222394 A1 | 9/2011 | Swinkels et al. |
| 2011/0222846 A1 | 9/2011 | Boertjes et al. |
| 2011/0229149 A1 | 9/2011 | Grubb et al. |
| 2011/0255870 A1 | 10/2011 | Grigoryan et al. |
| 2011/0307718 A1* | 12/2011 | Aybay .................. G06F 1/3206 713/310 |
| 2012/0163820 A1 | 6/2012 | Dangui et al. |
| 2012/0201130 A1 | 8/2012 | Liu et al. |
| 2012/0219288 A1 | 8/2012 | Roberts et al. |
| 2012/0219293 A1 | 8/2012 | Boertjes et al. |
| 2013/0209089 A1 | 8/2013 | Harley et al. |
| 2013/0209091 A1* | 8/2013 | Mateosky ........ H04B 10/07953 398/26 |
| 2013/0216232 A1 | 8/2013 | Zanoni et al. |
| 2013/0236169 A1* | 9/2013 | Gaudette ........... H04B 10/0795 398/25 |
| 2013/0272318 A1 | 10/2013 | Swinkels et al. |
| 2013/0308948 A1 | 11/2013 | Swinkels et al. |
| 2013/0336649 A1 | 12/2013 | Essiambre et al. |
| 2014/0212135 A1* | 7/2014 | Ji ..................... H04Q 11/0066 398/51 |

(56) References Cited

U.S. PATENT DOCUMENTS

2014/0241717 A1* 8/2014 Cvijetic ............ H04Q 11/0067
398/48

OTHER PUBLICATIONS

Gho et al., "Rate-Adaptive Coding for Optical Fiber Transmission Systems," IEEE Journal of Lightwave Technology, vol. 29, No. 2, Jan. 15, 2011.
Shafik et al., "On the Extended Relationships Among EVM, BER and SNR as Performance Metrics," Dec. 2006, ICECE, pp. 408-411.
Moosavi et al., "A Fast Scheme for Blind Identification of Channel Codes," Dec. 2011, IEEE, pp. 1-5.

* cited by examiner

SYSTEMS AND METHODS FOR MANAGING EXCESS OPTICAL CAPACITY AND MARGIN IN OPTICAL NETWORKS

CROSS-REFERENCE TO RELATED APPLICATION(S)

The present non-provisional patent application/patent is a continuation of U.S. patent application Ser. No. 14/886,584, filed on Oct. 19, 2015, and entitled "SYSTEMS AND METHODS FOR MANAGING EXCESS OPTICAL CAPACITY AND MARGIN IN OPTICAL NETWORKS," which is a continuation-in-part of:

(1) U.S. patent application Ser. No. 14/534,657, filed on Nov. 6, 2014, and entitled "HITLESS MODULATION SCHEME CHANGE SYSTEMS AND METHODS IN OPTICAL NETWORKS,"

(2) U.S. patent application Ser. No. 14/176,908, filed on Feb. 10, 2014, and entitled "SYSTEMS AND METHODS FOR MANAGING EXCESS OPTICAL CAPACITY AND MARGIN IN OPTICAL NETWORKS," and (3) U.S. patent application Ser. No. 13/372,013, filed on Feb. 13, 2012, and entitled "HIGH SPEED OPTICAL COMMUNICATION SYSTEMS AND METHODS WITH FLEXIBLE BANDWIDTH ADAPTATION," the contents of each of the foregoing is incorporated in full by reference herein.

FIELD OF THE DISCLOSURE

The present disclosure generally relates to optical networking. More particularly, the present disclosure relates to systems and methods for managing excess optical capacity and margin in optical networks.

BACKGROUND OF THE DISCLOSURE

Fiber optic communication networks are experiencing rapidly increasing growth in capacity. This capacity growth is reflected by individual channel data rates, scaling from 10 Gbps (gigabits per second), to 40 Gbps, to developing 100 Gbps, and to future projections of 1000 Gbps channels and beyond. The capacity growth is also reflected by increasing total channel count and/or optical spectrum carried within an optical fiber. In the past, optical channels were deployed with a fixed capacity in terms of bandwidth as well as a fixed amount of overhead for forward error correction (FEC). For example, in a conventional system deployment, channels are deployed at 10 Gbps or 40 Gbps (plus associated overhead for FEC). These channels are designed to provide fixed data throughput capacity of 10 Gbps or 40 Gbps. Moreover, the performance limits of these channels are established assuming that the system is operating at full capacity, with all the optical channels present. The first in channels will operate in much more benign condition and have significant extra margin available. This margin is not utilized until much later in the lifecycle of the system. For example, a single wavelength deployed on a new optical line system could have more than 10 dB of excess margin that is not currently utilized (without adding new hardware). This unused margin can be considered wasted and forcing the system to operate in a non-cost effective way. If this extra margin could be utilized, even in a temporary way, to enhance data throughput of the modem, for example, the economics of the system would be significantly improved.

Of note, next generation optical modems are equipped with the capability to support variable data throughput applications. Moreover, this capability will be provisionable. Therefore, depending on the opportunity, it would be advantageous to provision a modem at a higher data throughput when extra margin is available on new and low channel count deployments, usage of these next generation modem will allow to mine and use this excess margin and wasted capacity without requiring additional hardware. However, this excess margin will disappear as the channel counts approach full fill. It would be advantageous to have systems and methods for managing excess optical capacity and margin in optical networks in view of the above.

Fiber optic communication networks today are pushing up against the Shannon Limit within the non-linear tolerance of the transponder technology currently in use. There is great interest in providing the best spectral efficiency possible, which is leading to the development of adaptive modulation techniques applied to fiber optic transmission. In wireless and Digital Subscriber Loop (DSL) technology, it is quite common to use adaptive modulation schemes which adapt to link conditions, e.g. High-Speed Downlink Packet Access (HSDPA) and Asymmetric digital subscriber line (ADSL2+). In optical, some latest generation transponders on the market are capable of changing the modulation scheme, e.g. Ciena's WaveLogic3 family. Transponders in the future will be able to change modulation scheme more quickly, and may be optimized to do so. However, today's systems cannot take advantage of these in a hitless manner.

Although wireless and DSL technologies can react to channel conditions using adaptive modulation, the system constraints in fiber optic communication networks would not allow similar system techniques to work. In particular, there are two assumptions built into the algorithms used in these systems for wireless and DSL technologies. First, the data which is transported in both cases (wireless and DSL technologies) is bursty in nature, and the actual user data throughput vs. actual bit rate can be controlled. In wireless communication, the application layer is visible to the controller. In other words, the systems are designed to allow for periodic optimization where the resulting changes can be in modulation scheme. Optical transport networks are the core of the data network and as such see a rather continuous flow of traffic due to multiple levels of multiplexing and grooming. There are many sources of this data, and the volume is also very high, so hold-offs on data transmission become too complex and/or expensive to implement.

Second, another simplifying condition is that the transmission time (distance) from the modulator to the demodulator is small compared to the baud rate of the transmission. In practical terms, for example, for HSDPA networks in a 5 km cell and the baud rate of 5 Mbps, there are 8.3 baud in flight at any time. In an optical network using 100 Gbps over 2000 km, there is 440 million baud in flight. This nearly 8 orders of magnitude difference represent a key difference in how to perform such changes. Although there are some transponder on the market today which can change the operational state to accommodate a different spectral efficiency which may be allowed by the link conditions, these cause some length of outage which can only be managed out of service or as a failure in the system, both of which have negative effects on the system, and drive operational complexity for the end user. Treating it as an outage may cause higher level protocols to attempt to recover from the failure, leaving the system vulnerable to further failures. The treatment of a failure may also cause re-transmission of data, etc. With the vast amount of data involved, this is simply unacceptable.

For example, using conventional optical modems, such as the WaveLogic3, testing was performed to switch in-service between Quadrature Phase Shift Keying (QPSK) and 16-Quadrature Amplitude Modulation (16-QAM). The switch requires several seconds because operating conditions on the line including non-linear impairments have to be calculated. Again, it is expected that the switch can be optimized, but likely not on the order of several milliseconds.

BRIEF SUMMARY OF THE DISCLOSURE

In an exemplary embodiment, a method includes, in one or more of a management system, a management plane, and a control plane associated with an optical network, monitoring one or more optical links each formed by optical transceivers which are configured to provide variable capacity via a plurality of modulation formats; based on the monitoring, causing corresponding optical transceivers for the one or more optical links to operate at a first modulation format different from a second modulation format providing excess capacity; and mapping the excess capacity to bandwidth useable by one or more services managed by the one or more of the management system, the management plane, and the control plane. The second modulation format can support a nominally guaranteed rate over a corresponding optical link based on optical margin, and the first modulation format can include consumption of all or part of the optical margin. The method can further include advertising the bandwidth useable by the one or more services via the control plane. The useable by the one or more services can be allocated to one or more of one restoration bandwidth and short-lived bandwidth-on-demand connections. The method can further include detecting margin erosion of one of the corresponding optical transceivers; adjusting the corresponding optical transceivers to operate at the second modulation format and removing the excess capacity. The causing can include coordinating the change from the second modulation format to the first modulation format with one or more network elements in a path over corresponding optical links. The plurality of modulation formats can be discrete modulation levels which are adjusted to accommodate Signal-to-Noise (SNR) ratios on the corresponding optical links. The method can further include measuring and determining an average Signal-to-Noise (SNR) on the corresponding optical links and utilizing the average SNR to determine the first modulation format.

In another exemplary embodiment, a controller includes a network interface communicatively coupled to an optical network; a processor communicatively coupled to the network interface; and memory storing instructions that, when executed, cause the processor to monitor one or more optical links in the optical network each formed by optical transceivers which are configured to provide variable capacity via a plurality of modulation formats, based on the monitor, cause corresponding optical transceivers for the one or more optical links to operate at a first modulation format different from a second modulation format providing excess capacity, and map the excess capacity to bandwidth useable by one or more services managed by the controller.

In a further exemplary embodiment, an optical network element includes one or more transceivers each configured to provide a variable capacity via a plurality of modulation formats, and each connected to adjacent optical transceivers thereby forming corresponding optical links in an optical network; one or more switch modules configured to switch bandwidth; and a controller configured to monitor the corresponding optical links, based on the monitor, cause corresponding optical transceivers for the corresponding optical links to operate at a first modulation format different from a second modulation format providing excess capacity, and map the excess capacity to bandwidth useable by one or more services managed by the controller and switched through the one or more switch modules.

In an exemplary embodiment, a hitless modulation change method at a node in an optical network includes determining that a modulation change is warranted for an optical modem in the node, the optical modem configured to communicate over an optical link; determining an impact of the modulation change on the optical link and associated underlying connections thereon; causing changes in a data plane for the associated underlying connections, prior to performing the modulation change; and causing the modulation change subsequent to accommodating the associated underlying connections in the data plane, thereby minimizing interruptions of the associated underlying connections due to the modulation change. The hitless modulation change method can further include causing reversion of the associated underlying connections to the optical link subsequent to completion and verification of the modulation change. The causing changes in the data plane can utilize a control plane and restoration of the associated underlying connections per normal control plane behavior. The normal control plane behavior can include any of mesh restoration via the control plane, 1+1/1:1 Automatic Protection Switching (APS), Subnetwork Connection Protection (SNCP), ring restoration, G.8032 Ethernet Ring Protection Switching (ERPS), and Virtual Local Area Network (VLAN) protection. The determining the impact can include determining a length of time the modulation change will take. The length of time the modulation change will take can be based on a type of the modulation change from first modulation scheme to a second modulation scheme, link conditions, and line measurements. The length of time can be communicated with the changes in the data plane for the associated underlying connections. The determining steps and the causing steps can be performed by a control agent communicatively coupled to the node. The control agent can operate in an autonomous manner and communicates with existing control plane functionality associated with the node to cause the changes in the data plane.

In another exemplary embodiment, a hitless modulation change system communicatively coupled to a node in an optical network includes a processor; and memory storing instructions that, when executed, cause the processor to determine that a modulation change is warranted for an optical modem in the node, the optical modem is configured to communicate over an optical link, determine an impact of the modulation change on the optical link and associated underlying connections thereon, cause changes in a data plane for the associated underlying connections, prior to performing the modulation change, and cause the modulation change subsequent to accommodating the associated underlying connections in the data plane, thereby minimizing interruptions of the associated underlying connections due to the modulation change. The memory storing instructions that, when executed, can further cause the processor to cause reversion of the associated underlying connections to the optical link subsequent to completion and verification of the modulation change. The changes in the data plane can be caused utilizing a control plane and restoration of the associated underlying connections per normal control plane behavior. The normal control plane behavior can include any of mesh restoration via the control plane, 1+1/1:1 Automatic Protection Switching (APS), Subnetwork Connection Protection (SNCP), ring restoration, G.8032 Ethernet Ring Protection Switching (ERPS), and Virtual Local Area Network (VLAN) protection. The impact can include determining a length of time the modulation change will take. The length of time the modulation change will take can be based on a type of the modulation change from first modulation scheme to a second modulation scheme, link conditions, and line measurements. The length of time can be communicated with the changes in the data plane for the associated underlying connections. The hitless modulation change system can be implemented through or communicatively coupled to a Software Defined Networking (SDN) controller. The control agent can operate in an autonomous manner and communicates with existing control plane functionality associated with the node to cause the changes in the data plane.

In a further exemplary embodiment, an optical node implementing hitless modulation changes in an optical network includes one or more optical modems coupled to the optical network; a fabric coupled to the one or more optical modems for switching of connections; and a processing device implementing a control agent, wherein the control agent is configured to determine that a modulation change is warranted for an optical modem in the node, the optical modem is configured to communicate over an optical link, determine an impact of the modulation change on the optical link and associated underlying connections thereon, cause changes in a data plane for the associated underlying connections through the fabric, prior to performing the modulation change, and cause the modulation change subsequent to accommodating the associated underlying connections in the data plane, thereby minimizing interruptions of the associated underlying connections due to the modulation change. The changes can be caused in the data plane utilizing a control plane and restoration of the associated underlying connections per normal control plane behavior with the fabric.

In an exemplary embodiment, a fiber optic system includes a transmitter configured to utilize a plurality of modulation formats, and a receiver communicatively coupled to the transmitter and configured to utilize a plurality of modulation formats, wherein the transmitter and the receiver are cooperatively configured to set a modulation format of the plurality of modulation formats based upon signal-to-noise ratio associated therewith. The receiver can be configured to sense the signal-to-noise ratio through any of a bit error rate, a corrected forward error correction count, a symbol error rate, a constellation estimate, etc., and the receiver can be configured to communicate with the transmitter. The fiber optic system can further include transmitter data circuitry coupled to the transmitter, and receiver data circuitry coupled to the receiver, wherein each of the transmitter data circuitry and the receiver data circuitry is configured to adapt data between the transmitter and the receiver such that any changes between the plurality of modulation formats are performed in a hitless manner. The fiber optic system can further include a plurality of timeslots formed between the transmitter data circuitry and the receiver data circuitry, wherein a number of the plurality of timeslots are based at least on client data demands. Each of the transmitter and the receiver can be configured to cycle through a predetermined sequence of the plurality of modulation formats.

The plurality of modulation formats can include Binary Phase Shift Keying, Quadrature Phase Shift Keying, 8-Quadrature Amplitude Modulation, and 16-Quadrature Amplitude Modulation. Each of the transmitter and the receiver can be configured with a plurality of sub-channels. The transmitter and the receiver can be cooperatively configured to reduce bandwidth by excluding failed subsystems associated with any of the plurality of sub-channels. The fiber optic system can further include at least one intermediate optical transceiver between the transmitter and the receiver, and a mechanism for signaling adaptive modulation format changes between the transmitter, the at least one intermediate optical transceiver, and the receiver. The mechanism for signaling can be configured for any of the transmitter, the at least one intermediate optical transceiver, and the receiver to request a decrease in bandwidth due to degradation of the optical signal-to-noise ratio, and for the transmitter to request an increase in bandwidth. The fiber optic system can further include an in-band communication channel for signaling adaptive modulation format changes between the transmitter and the receiver, and a blind system recovery mechanism to establish the in-band communication channel between the transmitter and the receiver.

In another exemplary embodiment, an optical transceiver includes a transmitter configured to utilize a plurality of modulation formats, wherein the transmitter is communicatively coupled to a far end receiver, and a receiver communicatively configured to utilize a plurality of modulation formats, wherein the receiver is communicatively coupled to a far end transmitter, wherein the transmitter and the far end receiver are cooperatively configured to set a modulation format of the plurality of modulation formats based upon signal-to-noise ratio associated therewith, and wherein the receiver and the far end transmitter are cooperatively configured to set a modulation format of the plurality of modulation formats based upon signal-to-noise ratio associated therewith. The optical transceiver can further include a first plurality of sub-channels transmitted by the transmitter, and a second plurality of sub-channels received by the receiver, wherein each of the first plurality of sub-channels and the second plurality of sub-channels includes one of the plurality of modulation formats. The receiver can be configured to sense the optical signal-to-noise ratio through any of a bit error rate, a corrected forward error correction count, a symbol error rate, a constellation estimate, etc., and wherein the receiver is configured to communicate to the far end transmitter. The transmitter can include configurable modulators configured to provide any of Binary Phase Shift Keying, Quadrature Phase Shift Keying, 8-Quadrature Amplitude Modulation, and 16-Quadrature Amplitude Modulation.

In yet another exemplary embodiment, a flexible bandwidth adaptation method includes monitoring at least one aspect of an optical link at a network element; responsive to the at least one aspect, computing an improved modulation scheme of a plurality of modulation schemes for the optical link; and if the improved modulation scheme is computed, changing to the improved modulation scheme. The monitoring can include, at an originating network element of the optical link, monitoring for transceiver health and client bandwidth demand, and, at a terminating network element of the optical link, monitoring for signal-to-noise ratio. The flexible bandwidth adaptation method can further include the originating network element communicating with the terminating network element a degradation in the signal-to-noise and a request to adapt to a different modulation scheme based thereon. The flexible bandwidth adaptation method can further include, at an intermediate network element of the optical link, monitoring for signal-to-noise ratio, and communicating a degradation in the optical signal-to-noise and a request to adapt to a different modulation scheme based thereon. The flexible bandwidth adaptation method can further include, prior to changing to the improved modulation scheme, buffering data such that the change to the new modulation scheme is hitless.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
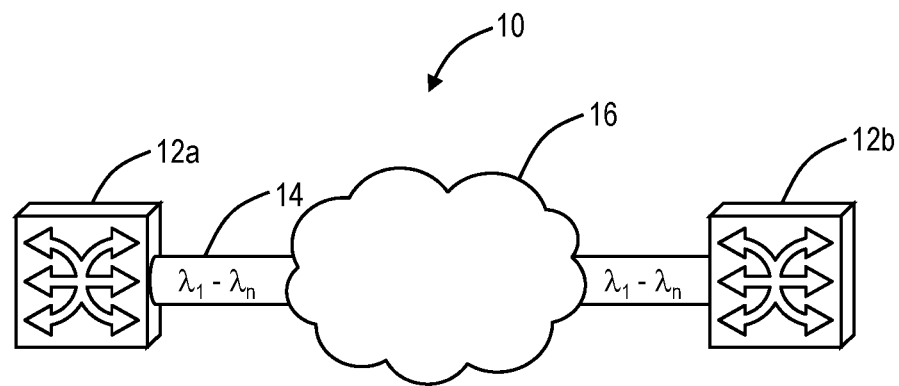
FIG. 1 is a network diagram of an exemplary network for the systems and methods for managing excess optical capacity and margin in optical networks.

In various exemplary embodiments, hitless modulation scheme change systems and methods in optical networks are described. The hitless modulation scheme change systems and methods allow modulation scheme changes of a transponder in a hitless manner so as to reap the benefit of changing the spectral efficiency to match link and system level requirements. The hitless modulation scheme change systems and methods provide a bottom-up approach and autonomous approach that negotiates a modulation change when one is warranted and ensures that existing traffic is not impacted during the modulation change. Due to the complex nature of high-speed optical transmission (e.g., coherent modulation, adaptive electrical signal processing, Forward Error Correction (FEC), etc.), it is extremely complex to switch a transponder or modem's modulation without impacting traffic. In this manner, the hitless modulation scheme change systems and methods propose an approach using a mechanism which coordinates between a data plane and control plane, i.e. using a fabric and a modem, to ensure current traffic is minimally impacted by a modulation scheme change. Note, as described herein, a hitless change means one in which traffic is impacted by 50 ms or less or by an amount based on service restoration (e.g., a mesh restoration event may be more than 50 ms). On the contrary, a modulation scheme change can take on the order of seconds to implement, given current implementations. It is expected that this amount of time will decrease, such as to is or less, but still higher than 50 ms.

Additionally, in various exemplary embodiments, systems and methods for managing excess optical capacity and margin in optical networks are described. Fundamentally, the systems and methods exploit the fact that next-gen flexible optical modems can support various bit-rates well beyond a guaranteed bit-rate in most operating situations (i.e., the guaranteed bit-rate is engineered for full-fill or worst-case, and in all other situations, higher bit-rates typically can be achieved). In the systems and methods described herein, techniques are described to actively mine this excess capacity to provide additional bandwidth without additional hardware that can be used for various purposes such as restoration traffic, short-lived bandwidth-on-demand connections, or the like. In an exemplary aspect, the systems and methods described herein are advantageous in first-in builds in that this excess capacity can be used for restoration traffic without requiring additional hardware in low-fill deployments. This can significantly lower the costs of first-in builds. Further, the systems and methods described herein contemplate integration between the flexible optical modems; a management system, management plane, and/or control plane; a switching plane to enable use and management of this excess capacity as one or more logical interfaces.

In various exemplary embodiments, flexible bandwidth adaptation systems and methods are described for terabit optical communication systems. The flexible bandwidth adaptation systems and methods include an optical transceiver, an optical network, and methods associated therewith. The flexible bandwidth adaptation systems and methods provide scalable and fault tolerant communication over fiber, redundant transmission of data to mitigate system anomalies and hardware failures, improve on the 'all or nothing' network operational scenario during times of degraded SNR (i.e., protection switch or not), adapt to underlying bandwidth demands, and the like. In an exemplary embodiment, high speed optical transceivers (e.g., 100 Gbps+) include support for a plurality of modulation formats in the same device, with the selection of modulation format based on the flexible bandwidth adaptation systems and methods.

Exemplary Network

Referring to FIG. 1, in an exemplary embodiment, a network diagram illustrates an exemplary network 10 implementing the systems and methods for managing excess optical capacity and margin in optical networks. The network 10 includes two interconnected network elements 12a, 12b via an optical link 14. Additionally, the optical link 14 can include additional components 16 which are omitted for illustration purposes. For example, the additional components 16 can include, without limitation, optical amplifiers, optical add/drop multiplexers (OADMs), reconfigurable OADMs (ROADMs), etc. In the context of the systems and methods, the network elements 12a, 12b are connected via the optical link 14 which is all-optical between the network elements 12a, 12b, i.e. no optical-electrical-optical (OEO) conversions between the network elements 12a, 12b. The optical link 14 can be a single span or multiple spans with intermediate amplifiers. Those of ordinary skill in the art will recognize that the network 10 can include other network elements 12a, 12b forming various architectures, i.e. mesh, rings, linear, etc. The network 10 is presented as a single optical link (optionally with the components 16) for an illustration of the systems and methods.

The optical link 14 can include N channels (or wavelengths), denoted as $\lambda_1$-$\lambda_n$. For example, the number N can be the maximum supported channels on the optical link 14. Additionally, the number N can be variable with respect to flexible grid channels (e.g., channels taking an arbitrary and variable amount of spectrum). For example, N can be 44 for 100 GHz channel spacing, 88 for 50 GHz channel spacing, or any combination in between to deliver between 36 and 88 wavelengths with flexible grid channels. Other embodiments are also contemplated. From a link engineering perspective, the optical link 14 is designed and implemented day one to support the N channels. However, greenfield installation or first-in builds (i.e., new) typically only include one or a couple of channels. Also, it can often take time to move from a couple of channels to a full complement of the N channels on the optical link 14. This can be referred to as a forecast tolerant modeling scheme where the optical link 14 is designed to support a full-fill that will eventually be realized but is likely, not present in first-in builds. Thus, from a system capacity perspective, the optical link 14 has unutilized margin and capacity in the first-in builds and where the optical link 14 has less than N channels deployed thereon.

In the context of the N channels, the N channels are either fixed capacity channels or variable capacity channels depending on associated hardware at the network elements 12a, 12b forming each of the N channels. In an exemplary embodiment, the optical line 14 can include one or more fixed capacity channels, one or more variable capacity channels, and/or a combination thereof. Fixed capacity channels are implemented through optical transceivers, transponders, muxponders (i.e., M:N combiners), etc. Here, the fixed capacity channels do not have an ability to vary the bandwidth, i.e. a 10 Gbps transponder with fixed capacity can only support 10 Gbps worth of traffic, etc. Fixed capacity channels may also include fixed channel spacing (e.g., 50/100 GHz) (i.e., fixed grid channels) and fixed FEC overhead. For a fixed capacity channel, if a channel has X dB excess margin, there is no way the fixed capacity channel can make use of this excess margin, i.e. the fixed capacity channel hardware is not configured to vary the bandwidth.

Variable capacity channels are implemented through flexible optical modems. In contrast to the fixed capacity channels, variable capacity channels typically include adaptable coherent modulation or non-coherent modulation, adaptive FEC schemes, and spectral shaping. A flexible optical modem can support a variable amount of bandwidth, e.g. from x Gbps to y Gbps, where x<y. For example, a flexible optical modem can support a guaranteed rate, e.g. 40 G, 100 G, 400 G, 1 T, etc. along with a higher supported rate, e.g. 40 G→100 G, 100 G→200 G, 400 G→1 T, etc. The flexible optical modem utilizes the adaptable coherent modulation, adaptive FEC schemes, and spectral shaping to support the variable amount of bandwidth. The limitations on the upper bound of the variable amount of bandwidth are based on i) what the optical link 14 can support, ii) backplane interfaces in the network element 12a, 12b with the flexible optical modem, and iii) adaptive modulation formats supported. An example of a flexible optical modem is the WaveLogic 3 from Ciena Corporation, the assignee of the present application/patent. Also, note the flexible optical modem may also be referred to as a transceiver, transponder, muxponder, etc.

With respect to adaptive coherent modulation, the flexible optical modem can support various different baud rates through software-programmable modulation formats. The flexible optical modem can support programmable modulation or constellations with both varying phase and/or amplitude. In an exemplary embodiment, the flexible optical modem can support multiple coherent modulation formats such as, for example, i) dual-channel, dual-polarization (DP) binary phase-shift keying (BPSK) for 100 G at submarine distances, ii) DP quadrature phase-shift keying (QPSK) for 100 G at ultra long haul distances, iii) 16-quadrature amplitude modulation (QAM) for 200 G at metro to regional (600 km) distances), or iv) dual-channel 16 QAM for 400 G at metro to regional distances. Thus, in this exemplary embodiment, the same flexible optical modem hardware can support 100 G to 400 G. With associated digital signal processing (DSP) in the flexible optical modem hardware, moving from one modulation format to another is completely software-programmable. In another exemplary embodiment, the flexible optical modem can support N-QAM modulation formats with and without dual-channel and dual-polarization where N can even be a real number and not necessarily an integer. Here, the flexible optical modem can support non-standard speeds since N can be a real number as opposed to an integer, i.e. not just 100 G, 200 G, or 400 G, but variable speeds, such as 130 G, 270 G, 560 G, etc. Furthermore, with the DSP and software programming, the capacity of the flexible optical modem can be adjusted upwards or downwards in a hitless manner so as not to affect the guaranteed rate.

With respect to the adaptive FEC schemes, the flexible optical modem can support a new soft-decision forward error correction (soft FEC) algorithm. The soft FEC can be software-programmable to adjust for low latency demands versus capacity/performance demands. The soft FEC uses variable-rate FEC codes which can take up variable amounts of an overall signal, e.g. 20%, 16%, 10%, 7%, etc. As is known in the art, the stronger the FEC, the more margin in dB is provided. In this manner, the soft FEC provides another opportunity to mine the excess capacity on a variable capacity channel. For example, assume a variable capacity channel is deployed with 20% FEC overhead with a margin of 10 dB. The FEC can be reduced, e.g., to 10% to reduce the margin and provide excess capacity for use. The strong FEC may not be needed until more channels are added to the optical link 14. An example of a soft-decision forward error correction algorithm is described in Gho et al., "Rate-Adaptive Coding for Optical Fiber Transmission Systems," IEEE JOURNAL OF LIGHTWAVE TECHNOLOGY, VOL. 29, NO. 2, Jan. 15, 2011, the contents of which are incorporated by reference herein. Note, the fixed capacity channel hardware may also implement FEC as well as a soft FEC. However, as described herein, the fixed capacity channel hardware is distinguishable from the variable capacity channel hardware in that it does not support an ability to mine the excess capacity. Rather, the fixed capacity channel hardware only supports a single guaranteed rate.

Figure 2:
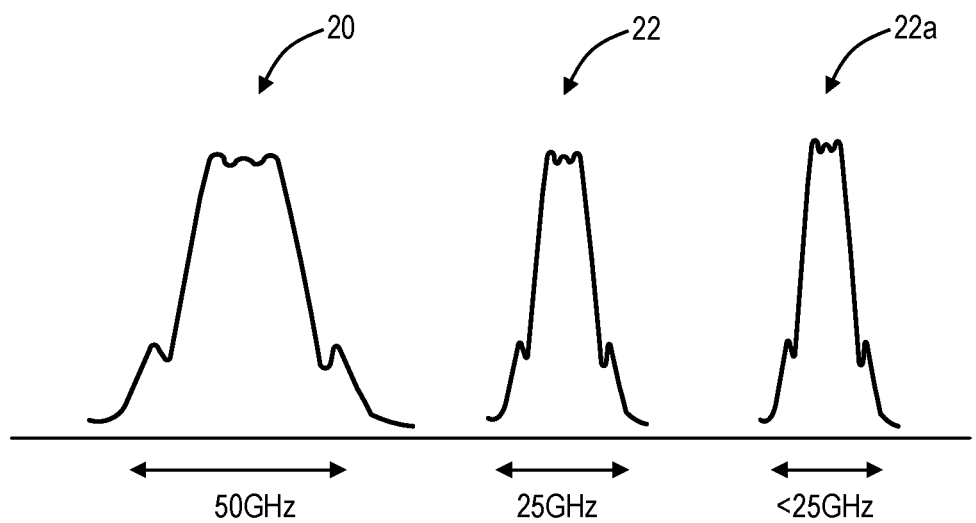
FIG. 2 are graphs of an example of spectral shaping fitting a 100 G signal into 50 GHz of bandwidth and into 25 GHz of bandwidth or less.

With respect to spectral shaping, the flexible optical modems can operate in both fixed- and flexible-grid environments. Referring to FIG. 2, in an exemplary embodiment, a spectral diagram illustrates an example of fitting a 100 G signal into 50 GHz of bandwidth (graph 20 representing a QPSK 100 G signal), into 25 GHz of bandwidth (graph 22 representing a 16 QAM 100 G signal), and into less than 25 GHz of bandwidth (graph 22a representing a spectrally shaped 16 QAM 100 G signal). Note, the 16 QAM 100 G which uses half the baud rate of the QPSK 100 G. If one is on a fixed grid, there is no gain in spectral efficiency, e.g. both signals fit into a 50 GHz channel. If one is allowed to change the channel spacing flexibly, then the spectral efficiency can be doubled, e.g. two 16 QAM 100 G signals in 50 GHz spacing. For example, in a first-in build solely with flexible optical modems, it may be advantageous to use a flexible-grid and space each 100 G signal in the minimal amount of bandwidth. However, in an existing fixed-grid, it may be required to fit the 100 G into 50 GHz of bandwidth. Here, in an exemplary embodiment, the systems and methods propose to harm intentionally fixed capacity channels with excess, but unusable margin to allow the flexible optical modem to use the excess margin.

Variously, it is an exemplary objective of the systems and methods to mine this unutilized margin and capacity to lower first-in network cost by allowing network operators to defer deploying excess capacity. Specifically, through the flexible optical modems, the systems and methods leverage the ability of the lines to provide the restoration bandwidth thereby deferring the deployment of additional optical interfaces as well as provide excess capacity that can be utilized for lower priority services, bandwidth-on-demand, etc. Specifically, first-in builds have significant excess margin, and with the emergence of flexible optical modems, it is an objective to provide and manage the excess margin to provide excess capacity without additional hardware or management constraints. That is, the flexible optical modems can significantly reduce initial costs by providing extra capacity that can be used for restoration, short-lived on-demand connections, or excess capacity with lower service-level agreements (SLAs). In conjunction with the foregoing, the systems and methods also include integration of this extra capacity with a management system, management plane, and/or control plane in the network 10 or other networks.

Managing Excess Optical Capacity and Margin

Figure 3:
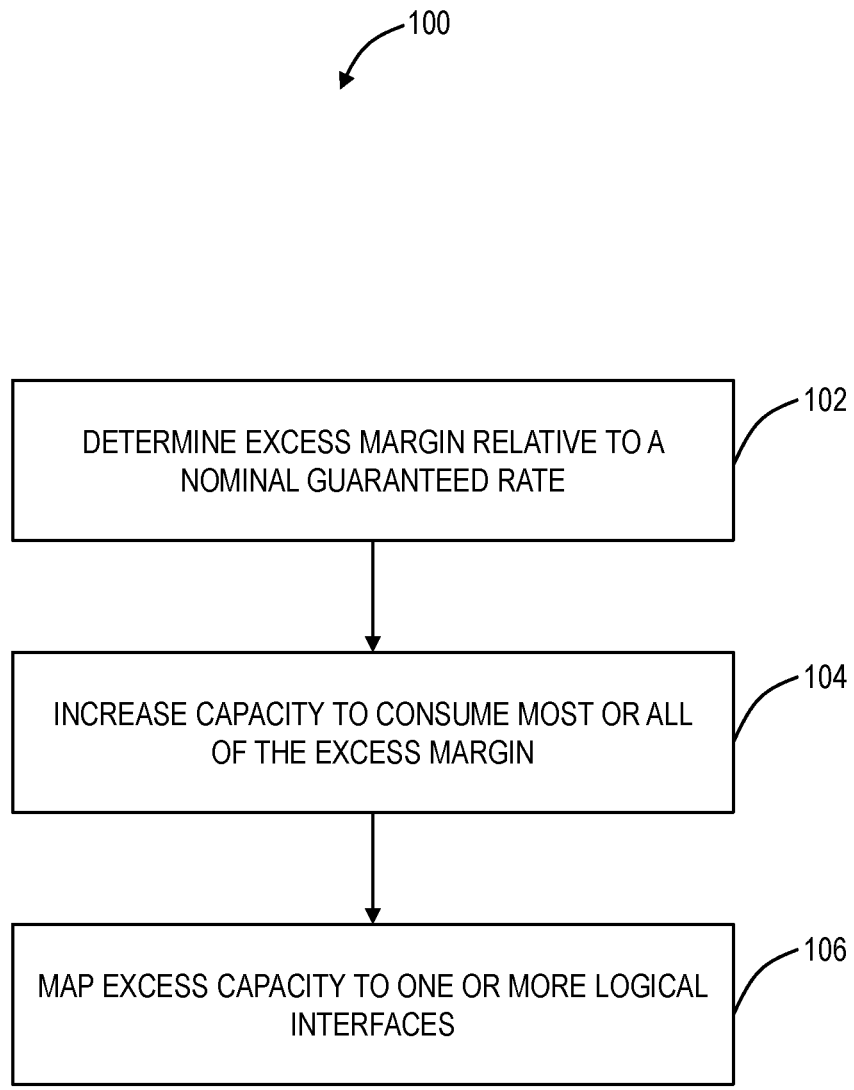
FIG. 3 is a flowchart of a method for managing excess optical capacity and margin in optical networks.

Referring to FIG. 3, in an exemplary embodiment, a flowchart illustrates a method 100 for managing excess optical capacity and margin in optical networks. The method 100 contemplates operation in the network 10 and other optical networks including flexible optical modems for variable capacity channels (and optionally with fixed capacity channels present as well.) The method 100 can be implemented on a single channel or wavelength of a flexible optical modem. The method 100 can be implemented on multiple channels concurrently or in series. For example, in series, each iteration of the method 100 may affect each subsequent iteration as the increased bandwidth of one channel may reduce the excess margin of the next. Performed concurrently, the method 100 may be based on a local determination of excess margin at each flexible optical modem without regard for collocated channels. The concurrent method could be independent (as stated) or in concert. Independent meaning that it is done per-channel without regard for other collocated channels, and in concert meaning that the margin of each channel is calculated taking into account the effect of the other collocated channels. This requires a "master" or nodal controller to amalgamate the channel information and perform the calculation.

The method 100 includes determining excess margin relative to a nominally guaranteed rate of a flexible optical modem (step 102). The nominally guaranteed rate can be the rate at which the flexible optical modem is configured to operate with a full-fill on the associated optical line. Also, the nominally guaranteed rate can be the rate that is guaranteed through link engineering to work under any conceivable condition on the optical line such as full-fill. The excess margin (in dB) is the extra margin that the flexible optical modem presently sees given the current conditions on the optical line (e.g., channel count). That is, the excess margin is determined relative to margin needed to ensure performance at a nominally guaranteed rate. As stated herein, it is expected that on first-in deployments, the flexible optical modem may see significant margin given the engineering requirement to design for the worst case (i.e., full-fill).

With the determined excess margin, the method 100 includes increasing capacity of the flexible optical modem to consume most or all of the excess margin (step 104). Thus, the flexible optical modem supports a nominally guaranteed rate for guaranteed bandwidth and an excess rate for excess bandwidth where the excess rate minus the nominally guaranteed rate equals the excess capacity. Here, the method 100 can use all of the excess margin or most of it, leaving a small amount (e.g., 1 dB or less) for the cushion to ensure the nominally guaranteed rate.

Next, the method 100 includes mapping the excess capacity to one or more logical interfaces (step 106). The logical interfaces are typically 1:1 mapped to physical interfaces. Specifically, the logical interfaces are used by a management system, management plane, and/or control plane to map physical interfaces onto the optical line. Exemplary logical interfaces can be defined in terms of bandwidth such as, for example, 155 Mpbs (Synchronous Transport Signal-level 1 (STS-1) or VC3), N×155 Mpbs (N×STS-1), 1 Gbps (GbE), 2.5 Gbps (OC-48/STM-1, OTU1, ODU1), 10 Gbps (OC-192/STM-64, OTU2, ODU2, 10 GbE), 40 Gbps (OC-768/STM-256, OTU3, ODU3, 40 GbE), 100 Gbs (OTU4, ODU4, 100 GbE), variable capacity ODUFlex, and the like. The logical interfaces can also be defined by signal type such as, for example, sub-network connections (SNCs), label switched paths (LSPs), 2F/4F BLSRs, 1+1/1:1 APS lines, UPSRs, VPSRs, 0:1 unprotected lines, etc. That is, the logical interfaces represent anything that allows the management system, management plane, and/or control plane to utilize the excess physical capacity from the method 100 in a network along with various switches.

Figure 6:
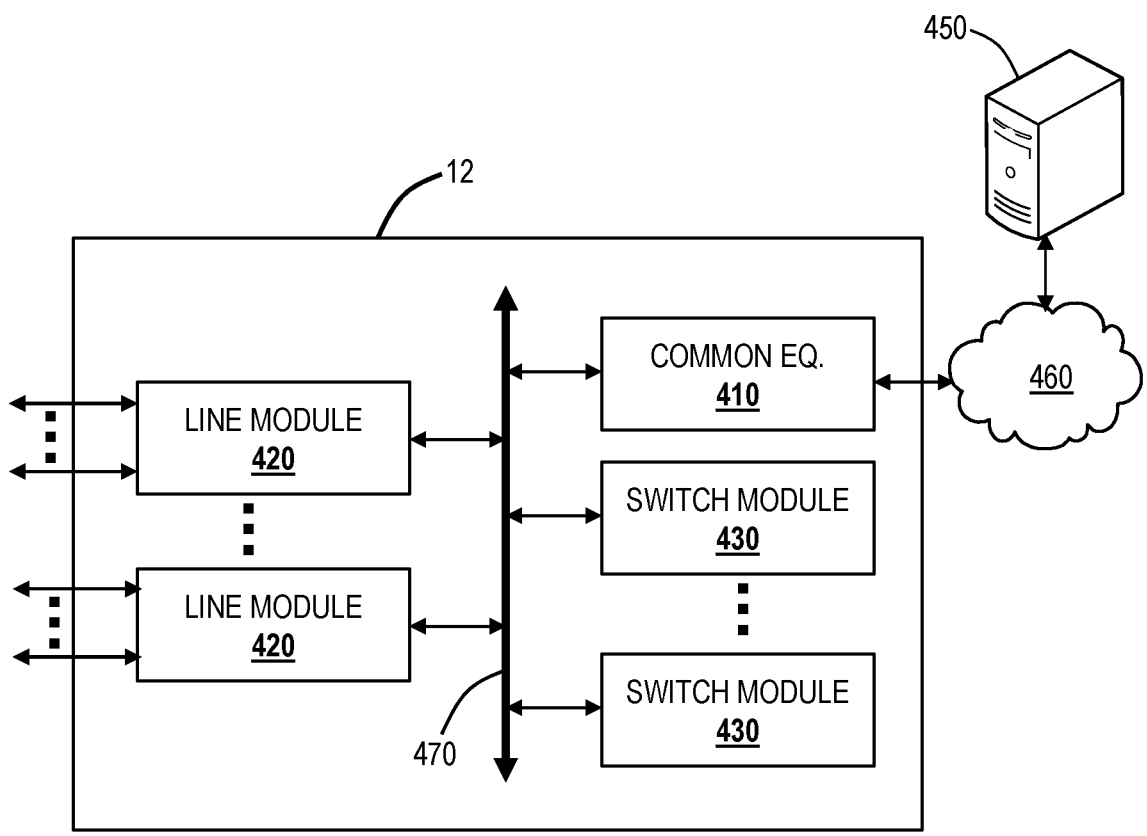
FIG. 6 is a block diagram of an exemplary network element for use with the methods and systems described herein.
Figure 7:
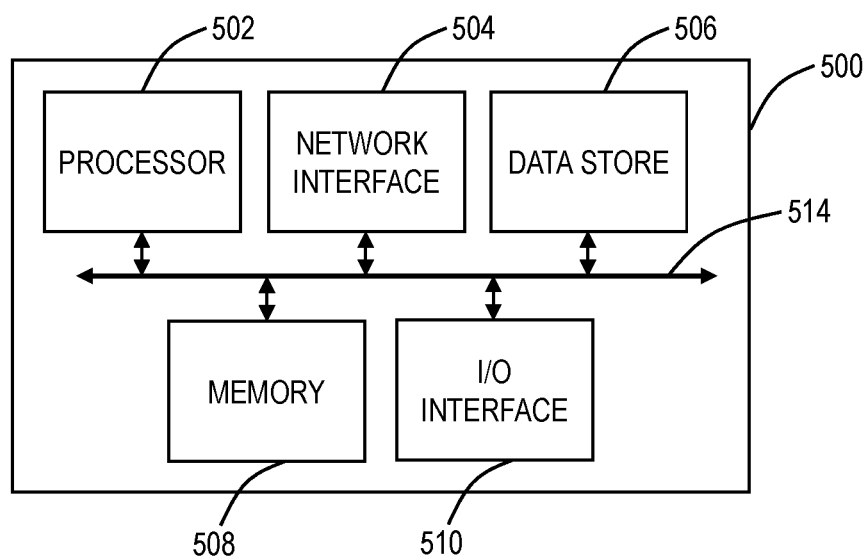
FIG. 7 is a block diagram of a controller to provide control plane processing and/or operations, administration, maintenance, and provisioning (OAM&P) for the network element of FIG. 6.

The management system, management plane, and/or control plane are configured to recognize the excess capacity is terms of the associated logical interfaces and to allow physical hardware at the network elements 12 to support these extra logical interfaces. From a hardware perspective, the extra logical interfaces are formed on the optical line via the flexible optical modems in accordance with the method 100. At the network elements 12 or collocated therewith, switches can be configured to process the extra logical interfaces through associated switching fabrics. Again, the management system, management plane, and/or control plane recognize these additional logical interfaces as extra traffic without requiring additional hardware (assuming the switching fabrics can support the additional capacity). Note, FIGS. 6-7 illustrate an exemplary network element 12 and associated control module for use with the systems and methods described herein.

In an exemplary embodiment, the method 100 includes flagging the bandwidth created in step 106 on the one or more logical interfaces as excess capacity. For example, the flagging can include notifying the management system, management plane, and/or control plane that the one or more logical interfaces are excess capacity. The reason is to flag to the management system, management plane, and/or control plane is that this capacity can disappear, and this needs to be accounted for. The method 100 can be periodically reiterated for each flexible optical modem. For example, the method 100 can be reiterated at set intervals or based on an occurrence such as channel additions/deletions to the optical lines or margin changes/erosion on the optical lines. With each iteration of the method 100, it is possible that the one or more logical interfaces could disappear or increase. For example, if channels are added to a line and the method 100 is rerun, the excess capacity could be decreased since the additional channels will likely reduce the excess margin. With a reduction in the excess capacity, some or all of the logical interfaces based thereon could disappear as the flexible optical modem scales back bandwidth or returns to the nominally guaranteed rate.

Accordingly, in an exemplary aspect, the method 100 contemplates using these logical interfaces based on the excess capacity for restoration bandwidth in new or low-fill optical networks as well as for bandwidth-on-demand, i.e. short-lived SNCs or LSPs, etc., and lower cost bandwidth with minimal SLA requirements. Specifically, in first-in builds, the method 100 can significantly reduce costs using the logical interfaces based on the excess capacity as mesh restoration SNCs or LSPs. This can defer the cost of additional optical interfaces to form unused capacity that is dedicated to restoration. Thus, in first-in builds, all optical hardware can be utilized for revenue generation.

Figure 4:
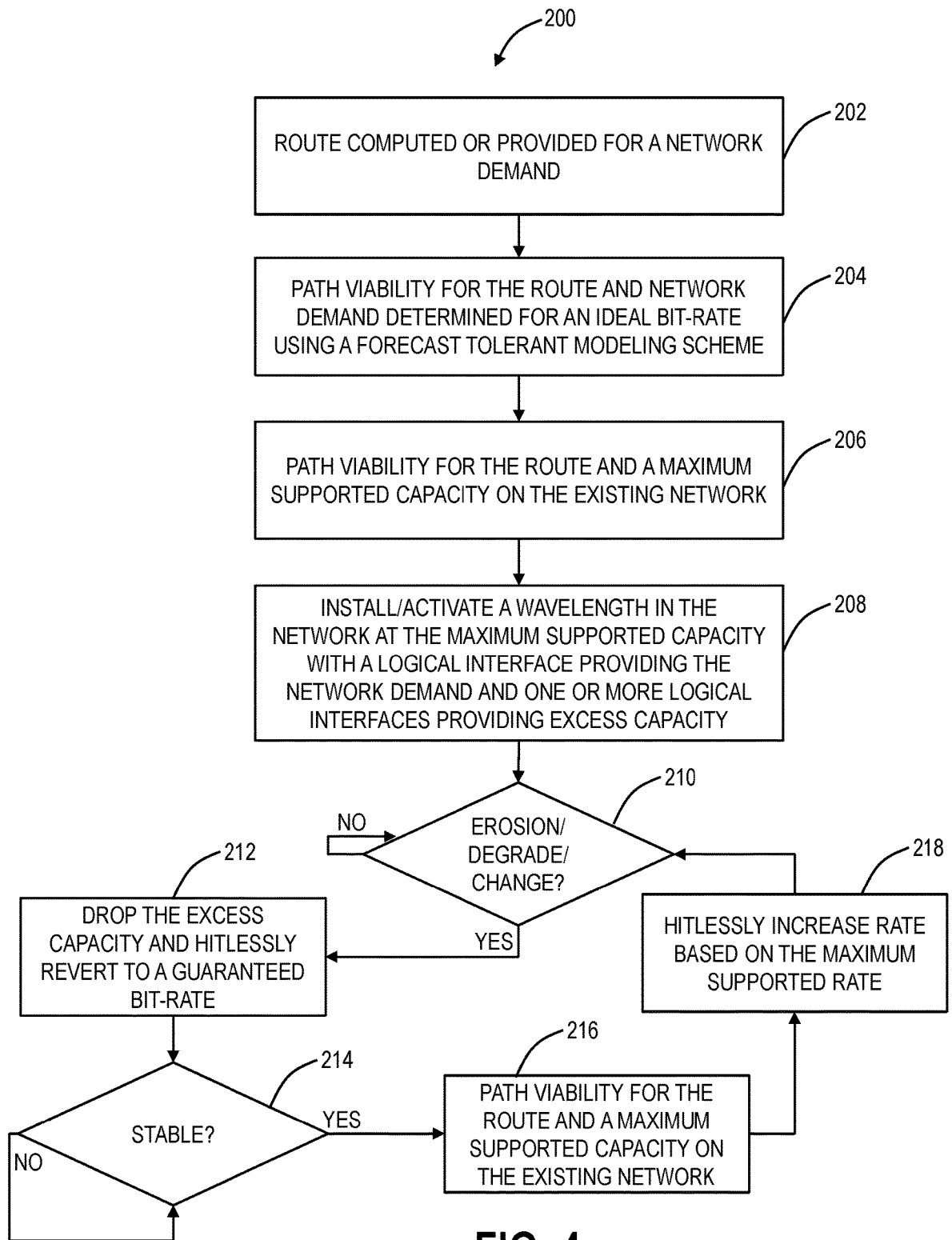
FIG. 4 is a flowchart of another method for managing excess optical capacity and margin in optical networks.

Referring to FIG. 4, in an exemplary embodiment, a flow chart illustrates another method 200 for managing excess optical capacity and margin in optical networks. The method 200 is similar to the method 100 and provides additional details. Similarly, the method 200 contemplates operation in the network 10 and other optical networks, including flexible optical modems for variable capacity channels (and optionally with fixed capacity channels present as well.) The method 200 can be implemented on a single channel or wavelength of a flexible optical modem. The method 200 can be implemented on multiple channels concurrently or in series. For example, in series, each iteration of the method 200 may affect each subsequent iteration as the increased bandwidth of one channel may reduce the excess margin of the next. Performed concurrently, the method 200 may be based on a local determination of excess margin at each flexible optical modem without regard for collocated channels. The concurrent method could be independent (as stated) or in concert. Independent meaning that it is done per-channel without regard for other collocated channels, and in concert meaning that the margin of each channel is calculated taking into account the effect of the other collocated channels. This requires a "master" or nodal controller to amalgamate the channel information and perform the calculation.

The method 200 includes computing or providing a route for a network demand (step 202). The network demand is a guaranteed amount of bandwidth needed in the network between two optical network elements 12, e.g. 10 G, 40 G, 100 G, etc. The method 200 can receive an explicit route or calculate a route using control plane techniques. Next, the method 200 includes determining path viability for the route and the network demand for an ideal bit-rate using a forecast tolerant modeling scheme (step 204). For example, this functionality can be performed in a management system, an optical modeling system, etc., and this functionality includes determining the guaranteed wavelength capacity under worst-case conditions such as at full-fill, etc. That is, the forecast tolerant modeling scheme ensures the network demand can be serviced by the route regardless of future constraints. The step 204 could also optionally include a wavelength assignment. The selection of wavelength could take into account the selection of wavelengths currently available (not in use).

Next, the method 200 includes determining path viability for the route and a maximum supported capacity on the existing network (step 206). The step 206 could also optionally include a wavelength assignment. The selection of wavelength, in this case, could differ from the step 204 in that it could select wavelengths which maximize the potential excess bandwidth. For example, it could choose to separate wavelengths from those already in service or to allocate a different spectral width to the channel being routed. The wavelength assignment in this step could change the wavelength previously chosen in step 204. Alternatively, this excess bandwidth aware wavelength assignment could be applied in step 204.

Step 204 looks at the worst case, whereas step 206 looks at current conditions (i.e., right now without adding in a margin for added channels or end-of-life operation). Step 204 determines the guaranteed wavelength capacity while step 206 determines the current maximum wavelength capacity. It is the delta between these two scenarios that constitutes the excess margin and capacity opportunities with flexible optical modems. From a computation perspective, assign the value determined in step 206 as Max and:

$$\text{Max\_Engineered} = \text{Max} - \delta_{margin}$$

where Max_Engineered is the maximum currently supported bandwidth, Max is the result of step 206 (i.e., the maximum physical bandwidth), and $\delta_{margin}$ is a small engineering margin simply to avoid a signal degrade threshold and this value can be 0 or a small amount such as <1 dB. The result of step 204 can be denoted as Guaranteed, i.e. the guaranteed wavelength capacity. Accordingly:

$$\text{Excess} = \text{Max\_Engineered} - \text{Guaranteed}$$

where Excess is the additional excess capacity currently supported that can be mined by the method 200 (or the method 100).

Next, the method 200 includes installing and/or activating a wavelength in the network at the Max_Engineered rate with a logical interface thereon supporting the guaranteed rate for the network demand and one or more logical interfaces providing the excess capacity (step 208). Here, the method 200, similar to the method 100, can provide these one or more logical interfaces from the excess capacity to a management plane and a switching plane for use thereof as restoration capacity, bandwidth-on-demand (BOD), short-lived services, etc. The method 200 can implement the various functionality described in the method 100 as well for implementing the one or more logical interfaces from the excess capacity.

The method 200 will operate with the logical interface supporting the guaranteed rate and with the one or more logical interfaces providing the excess capacity until a margin erosion, signal degradation, or other change (step 210). Again, it is expected at the client layer that the logical interface for the guaranteed capacity can be used for any service request, but specifically long-lived traffic. On the other hand, the client layer could use the excess capacity for any service request, but it would be prudent only to use it for temporary traffic (e.g. restoration traffic, bandwidth-on-demand with a known termination date and time, etc.). In the method 200, if there is margin erosion, or a signal degrade crossing (step 210), the flexible optical modem can drop the excess capacity and hitlessly revert back to the guaranteed bit-rate (step 212). In this way, the excess margin is now used to make up for the margin erosion or the signal degrade crossing and not for the excess capacity. The excess capacity is lost, but the guaranteed capacity is protected from the margin erosion or the signal degrade crossing.

Once stability has been achieved for a set amount of time (e.g., 5 minutes, 2 hours, etc.) (step 214), the method 200 can include performing path viability for the route and a maximum supported capacity on the existing network (step 216). The step 216 is similar to the step 206. Once it is determined what excess margin exists after stability, the flexible optical modem can hitlessly increase its rate based on the maximum supported rate from the step 216 (and the guaranteed rate from the step 204). Also, if a path completely fails, then an alternate path is computed (per typical control plane behavior) and installed. The method 200 can operate as well on the new alternate path. For example, the method 200 can be implemented subsequent to a protection switch after stability is achieved.

Figure 5:
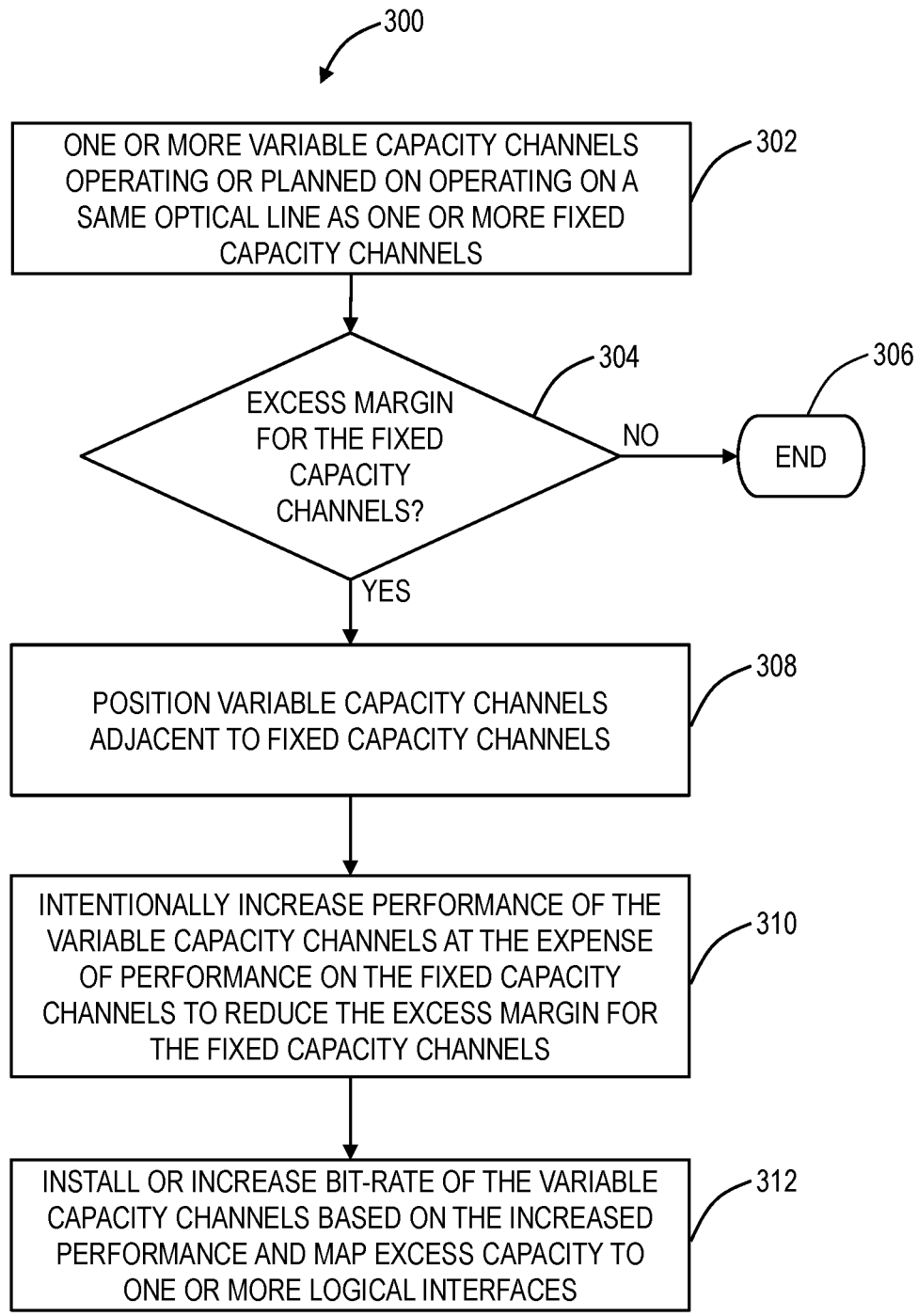
FIG. 5 is a flowchart of a coexistence method for managing excess optical capacity and margin in optical networks with both variable capacity channels and fixed capacity channels intermixed.

Referring to FIG. 5, in an exemplary embodiment, a flow chart illustrates a coexistence method 300 for managing excess optical capacity and margin in optical networks with both variable capacity channels and fixed capacity channels intermixed. Specifically, the coexistence method 300 contemplates operation along with the methods 100, 200 in the network 10 and other optical networks, including flexible optical modems for variable capacity channels and with fixed capacity channels present as well. The coexistence method 300 begins with an assumption that any excess margin on a fixed capacity channel is unusable as discussed herein. The coexistence method 300 looks for opportunities to reduce this unusable excess margin to increase the excess margin on variable capacity channels for increased excess capacity according to the methods 100, 200.

The method 300 includes one or more variable capacity channels operating or planned on being operated on a same optical line or link as one or more fixed capacity channels (step 302). The method 300 can be implemented at various stages—in new systems where just a couple of channels are used all the way up to full-fill. The method 300 checks if there is an excess margin for any of the fixed capacity channels (step 304), and if not, the method 300 ends (step 306). If there is an excess margin on any of the fixed capacity channels (step 304), the method 300 utilizes various techniques to mine this excess margin for the benefit of the variable capacity channels (which in turn can implement the methods 100, 200 whereas the fixed capacity channels cannot).

The method 300 can include positioning or ensuring the variable capacity channels are located adjacent to fixed capacity channels on the optical spectrum (step 308). That is, it is advantageous for the method 300 to have fixed capacity channels adjacent to the variable capacity channels as opposed to separating these channels on the spectrum. The method 300 includes intentionally increasing performance of the variable capacity channels at the expense of the fixed capacity channels (with excess margin) to reduce the excess margin for the fixed capacity channels while concurrently increasing the excess margin for the variable capacity channel (step 310). In a way, it can be said that the method 300 intentionally harms the fixed capacity channels to remove the excess margin so it can be used by the variable capacity channels.

The method 300 contemplates various options for adjusting both the fixed capacity channels with excess margin and the variable capacity channels. For example, the fixed capacity channels could be transmitted at lower output powers to make these channels less intrusive to neighboring variable capacity channels and, therefore, increase the performance of the neighboring variable capacity channels. Further, the fixed capacity channels could be transmitted at a reduced baud rate and increased signal density to transmit in a format that takes more OSNR but uses less spectrum. Also, the variable capacity channel can intrude into the spectrum of the fixed capacity channel. For example, in FIG. 2, the variable capacity channel can extend 10 GHz into each of its neighbors to support 70 GHz of bandwidth versus 50 GHz thereby providing an additional margin for the variable capacity channel.

The method 300 can install or increase bit-rate of the variable capacity channels based on the increased performance and margin "stolen" from the fixed capacity channels and map this excess capacity to one or more logical interfaces such as described in the methods 100, 200 (step 312). In an exemplary embodiment, a method includes determining excess margin relative to margin needed to ensure performance at a nominally guaranteed rate associated with a flexible optical modem configured to communicate over an optical link; causing the flexible optical modem to consume most or all of the excess margin, wherein the capacity increased above the nominally guaranteed rate includes excess capacity; and mapping the excess capacity to one or more logical interfaces for use by a management system, management plane, and/or control plane. The method can further include utilizing the one or more logical interfaces by the management system, management plane, and/or control plane as one of restoration bandwidth or short-lived bandwidth-on-demand connections. The method can further include determining the excess margin relative to the nominal guaranteed rate through the steps of: determining path viability of a network demand over the optical link for an ideal bit-rate using a forecast tolerant modeling scheme; determining path viability for a maximum supported capacity over the optical link based on existing conditions on the optical link; and determining the excess margin as a difference between the path viability for a maximum supported capacity and the path viability of the network demand along with including a small engineering margin. The method can further include detecting margin erosion, or a signal degrade on the flexible optical modem, and dropping the excess capacity and hitlessly reverting to the nominally guaranteed rate. The method can further include after a period of stability subsequent to the margin erosion or the signal degrade, determining again the path viability for a new maximum supported capacity over the optical link based on existing conditions on the optical link; and hitlessly increasing a rate of the flexible optical modem based on the new maximum supported capacity.

The method can further include updating the determined excess margin relative to the nominally guaranteed rate in the flexible optical modem responsive to channels added or deleted on the optical link. The flexible optical modem can form a variable capacity channel, wherein the optical link can include a fixed capacity channel adjacent to the variable capacity channel, and the method can further include determining excess margin for the fixed capacity channel that is unusable since the fixed capacity channel cannot modify its rate; increasing performance of the variable capacity channel and/or decreasing performance of the fixed capacity channel based on the excess margin for the fixed capacity channel; and increasing bit-rate of the variable capacity channel based on margin gained by the increased performance of the variable capacity channel and/or the decreased performance of the fixed capacity channel. The method can further include increasing performance of the variable capacity channel including extending associated optical spectrum into optical spectrum from the fixed capacity channel; and decreasing performance of the fixed capacity channel includes any of lowering output power to make the fixed capacity channel less intrusive to the variable capacity channel, or transmitting at a reduced baud rate and/or increased signal density to transmit in a format that uses less of the optical spectrum. The method can further include operating a control plane, and utilizing the one or more logical interfaces for restoration sub-network connections or label switched paths.

In another exemplary embodiment, a network element includes at least one flexible optical modem; and a controller configured to: determine excess margin relative to margin needed to ensure performance at a nominal guaranteed rate associated with the at least one flexible optical modem configured to communicate over an optical link; cause the at least one flexible optical modem to consume most or all of the excess margin, wherein the capacity increased above the nominally guaranteed rate includes excess capacity; and map the excess capacity to one or more logical interfaces for use by a management system, management plane, and/or control plane. The controller can be further configured to utilize the one or more logical interfaces as one of restoration bandwidth or short-lived bandwidth-on-demand connections. The controller can be further configured to determine the excess margin relative to the nominal guaranteed rate through the steps of: determine path viability of a network demand over the optical link for an ideal bit-rate using a forecast tolerant modeling scheme; determine path viability for a maximum supported capacity over the optical link based on existing conditions on the optical link; and determine the excess margin as a difference between the path viability for a maximum supported capacity and the path viability of the network demand along with including a small engineering margin. The controller can be further configured to detect margin erosion or a signal degrade on the at least one flexible optical modem, and drop the excess capacity and hitlessly reverting to the nominally guaranteed rate.

The controller can be further configured to, after a period of stability subsequent to the margin erosion or the signal degrade, determine again the path viability for a new maximum supported capacity over the optical link based on existing conditions on the optical link; and hitlessly increase a rate of the flexible optical modem based on the new maximum supported capacity. The controller can be further configured to update the determined excess margin relative to the nominally guaranteed rate in the at least flexible optical modem responsive to channels added or deleted on the optical link. The at least one flexible optical modem can form a variable capacity channel, wherein the optical link includes a fixed capacity channel adjacent to the variable capacity channel, and the controller can be further configured to determine excess margin for the fixed capacity channel that is unusable since the fixed capacity channel cannot modify its rate; increase performance of the variable capacity channel and/or decreasing performance of the fixed capacity channel based on the excess margin for the fixed capacity channel; and increase a bit-rate of the variable capacity channel based on margin gained by the increase performance of the variable capacity channel and/or the decreased performance of the fixed capacity channel. The controller can be further configured to increase performance of the variable capacity channel including extending associated optical spectrum into optical spectrum from the fixed capacity channel; and decrease performance of the fixed capacity channel including the of lowering output power to make the fixed capacity channel less intrusive to the variable capacity channel, or transmitting at a reduced baud rate and/or increased signal density to transmit in a format that uses less of the optical spectrum. The controller can be further configured to operate a control plane, and utilize the one or more logical interfaces for the restoration of sub-network connections or label switched paths.

In yet another exemplary embodiment, a network includes a plurality of interconnected network elements, at least one link in the network formed between two of the plurality of interconnected network elements is formed by flexible optical modems; a control plane communicatively coupled to the plurality of interconnected network elements; and a controller communicatively coupled to the flexible optical modems and configured to: determine excess margin needed to ensure performance at a nominally guaranteed rate over the at least one link; cause the flexible optical modems to consume most or all of the excess margin, wherein the capacity increased above the nominally guaranteed rate includes excess capacity; and map the excess capacity to one or more logical interfaces for use by the control plane. The controller can be further configured to utilize the one or more logical interfaces as one of restoration bandwidth or short-lived bandwidth-on-demand connections.

Exemplary Network Element

Referring to FIG. 6, in an exemplary embodiment, a block diagram illustrates an exemplary network element 12 for use with the methods and systems described herein. In an exemplary embodiment, the exemplary network element 12 can be a network element that may consolidate the functionality of a multi-service provisioning platform (MSPP), digital cross-connect (DCS), Ethernet and/or Optical Transport Network (OTN) switch, dense wave division multiplexed (DWDM) platform, etc. into a single, high-capacity intelligent switching system providing Layer 0, 1, and 2 consolidation. In another exemplary embodiment, the network element 12 can be any of an OTN add/drop multiplexer (ADM), a SONET/SDH/OTN ADM, a multi-service provisioning platform (MSPP), a digital cross-connect (DCS), an optical cross-connect, an optical switch, a router, a switch, a wavelength division multiplexing (WDM) terminal, an access/aggregation device, etc. That is, the network element 12 can be any digital system with ingress and egress digital signals and switching therebetween of channels, timeslots, tributary units, wavelengths, etc. utilizing OTN, SONET, SDH, etc. Alternatively, the network element 12 can exclude digital switching and solely provide optical switching and/or transmission. While the network element 12 is generally shown as an optical network element, the systems and methods contemplated for use with any switching fabric, network element, or network based thereon.

In an exemplary embodiment, the network element 12 includes common equipment 410, one or more line modules 420, and one or more switch modules 430. The common equipment 410 can include power; a control module; operations, administration, maintenance, and provisioning (OAM&P) access; user interface ports; and the like. The common equipment 410 can connect to a management system 450 through a data communication network 460. The management system 450 can include a network management system (NMS), element management system (EMS), or the like. Additionally, the common equipment 410 can include a control plane processor configured to operate a control plane as described herein. The network element 12 can include an interface 470 for communicatively coupling the common equipment 410, the line modules 420, and the switch modules 430 therebetween. For example, the interface 470 can be a backplane, midplane, a bus, optical or electrical connectors, or the like. The line modules 420 are configured to provide ingress and egress to the switch modules 430 and external to the network element 12. In an exemplary embodiment, the line modules 420 can form ingress and egress switches with the switch modules 430 as center stage switches for a three-stage switch, e.g. a three-stage Clos switch. Other configurations and/or architectures are also contemplated. The line modules 420 can include optical transceivers, such as, for example, 1 Gbps (GbE PHY), 2.5 Gbps (OC-48/STM-1, OTU1, ODU1), 10 Gbps (OC-192/STM-64, OTU2, ODU2, 10 GbE PHY), 40 Gbps (OC-768/STM-256, OTU3, ODU3, 40 GbE PHY), 100 Gbps (OTU4, ODU4, 100 GbE PHY), etc.

Further, the line modules 420 can include a plurality of optical connections per module and each module may include a flexible rate support for any type of connection, such as, for example, 155 Mbps, 622 Mbps, 1 Gbps, 2.5 Gbps, 10 Gbps, 40 Gbps, 100 Gbps, 400 Gbps, 1 Tbps, and any rate in between. The line modules 420 can include wavelength division multiplexing interfaces, short reach interfaces, and the like, and can connect to other line modules 420 on remote network elements, end clients, edge routers, and the like. From a logical perspective, the line modules 420 provide ingress and egress ports to the network element 12, and each line module 420 can include one or more physical ports. As described herein the line modules 420 can support either fixed capacity channels or variable capacity channels. The line modules 420 can be transponders, muxponders, flexible optical modems, etc. Note, if the network element 12 is a DWDM terminal, the switch modules 430 may be omitted and the line modules 420 act as transponders, muxponders, etc. It is assumed that a switch device is at some point connected to the DWDM terminal to support the one or more logical interfaces that are formed from the excess capacity.

The switch modules 430 are configured to switch channels, timeslots, tributary units, etc. between the line modules 420. For example, the switch modules 430 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet packet granularity; Digital Signal n (DSn) granularity such as DS0, DS1, DS3, etc.; and the like. Specifically, the switch modules 630 can include both Time Division Multiplexed (TDM) (i.e., circuit switching) and packet switching engines. The switch modules 430 can include redundancy as well, such as 1:1, 1:N, etc. In an exemplary embodiment, the switch modules 430 provide OTN, SONET, or SDH switching.

Those of ordinary skill in the art will recognize the network element 12 can include other components which are omitted for illustration purposes, and that the systems and methods described herein are contemplated for use with a plurality of different network elements with the network element 12 presented as an exemplary type of network element. For example, in another exemplary embodiment, the network element 12 may not include the switch modules 430, but rather have the corresponding functionality in the line modules 420 (or some equivalent) in a distributed fashion or completely omit the corresponding functionality as in the case of a DWDM terminal. For the network element 12, other architectures providing ingress, egress, and switching therebetween are also contemplated for the systems and methods described herein. In general, the systems and methods described herein contemplate use with any network element providing switching and/or transport of OTN, SONET, SDH, etc. channels, timeslots, tributary units, wavelengths, packets, etc. Furthermore, the network element 12 is merely presented as one exemplary implementation for the systems and methods described herein. Those of ordinary skill in the art will recognize the systems and methods can be used for practically any type of network element that includes flexible optical modems for supporting variable capacity channels.

Exemplary Controller

Referring to FIG. 7, in an exemplary embodiment, a block diagram illustrates a controller 500 to provide control plane processing and/or operations, administration, maintenance, and provisioning (OAM&P) for the network element 12. The controller 500 can be part of the common equipment, such as common equipment 410 in the network element 12. The controller 500 can include a processor 502 which is a hardware device for executing software instructions such as operating the control plane. The processor 502 can be any custom made or commercially available processor, a central processing unit (CPU), an auxiliary processor among several processors associated with the controller 500, a semiconductor-based microprocessor (in the form of a microchip or chip set), or generally any device for executing software instructions. When the controller 500 is in operation, the processor 502 is configured to execute software stored within memory, to communicate data to and from the memory, and to generally control operations of the controller 500 pursuant to the software instructions. The controller 500 can also include a network interface 504, a data store 506, memory 508, an I/O interface 510, and the like, all of which are communicatively coupled therebetween and with the processor 502.

The network interface 504 can be used to enable the controller 500 to communicate over a network, such as to communicate control plane information to other controllers, to the management system 460, to a Software Defined Networking or OpenFlow controller, and the like. The network interface 504 can include, for example, an Ethernet card (e.g., 10BaseT, Fast Ethernet, Gigabit Ethernet) or a wireless local area network (WLAN) card (e.g., 802.11a/b/g). The network interface 504 can include address, control, and/or data connections to enable appropriate communications on the network. The data store 506 can be used to store data, such as control plane information, provisioning data, OAM&P data, etc. The data store 506 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 506 can incorporate electronic, magnetic, optical, and/or other types of storage media. The memory 508 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 508 may incorporate electronic, magnetic, optical, and/or other types of storage media. Note that the memory 508 can have a distributed architecture, where various components are situated remotely from one another, but may be accessed by the processor 502.

The I/O interface 510 includes components for the controller 500 to communicate with other devices in a node, such as through the local interface 514. The components 502, 504, 506, 508, 510) are communicatively coupled via a local interface 514. The local interface 514 and the I/O interface 510 can be, for example, but not limited to, one or more buses or other wired or wireless connections, as is known in the art. The local interface 514 and the I/O interface 510 can have additional elements, which are omitted for simplicity, such as controllers, buffers (caches), drivers, repeaters, and receivers, among many others, to enable communications. Further, the local interface 514 and the I/O interface 510 can include address, control, and/or data connections to enable appropriate communications among the aforementioned components.

The network element 12, the controller 500, and associated optical networks and the like can utilize control plane systems and methods in addition to or in replace of the standard management system functionality. Control plane systems and methods provide an automatic allocation of network resources in an end-to-end manner. Exemplary control planes may include Automatically Switched Optical Network (ASON) as defined in G.8080/Y.1304, Architecture for the automatically switched optical network (ASON) (02/2005), the contents of which are herein incorporated by reference; Generalized Multi-Protocol Label Switching (GMPLS) Architecture as defined in Request for Comments (RFC): 3945 (10/2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections there between. It is essential for the operation of control planes to have control plane signaling and Operations, Administration, Maintenance, and Provisioning (OAM&P) connectivity between nodes.

It is important to note that the one or more logical interfaces from the methods 100, 200, 300 are provided to the control plane and/or management system for use thereof. In the control plane, the one or more logical interfaces can be used for path computation, especially for mesh reroutes in failure scenarios or for short-lived SNC or LSP requests. Thus, the systems and methods described herein provide the methods 100, 200, 300 for determining and setting maximum bandwidths on flexible optical modems, the control plane and/or management system are made aware of the excess capacity as one or more logical interfaces that are flagged as excess capacity, and collocated switching fabrics can use these one or more logical interfaces at the direction of the control plane and/or management system for various purposes such as restoration or short-lived SNCs or LSPs.

Hitless Modulation Change System

Figure 8:
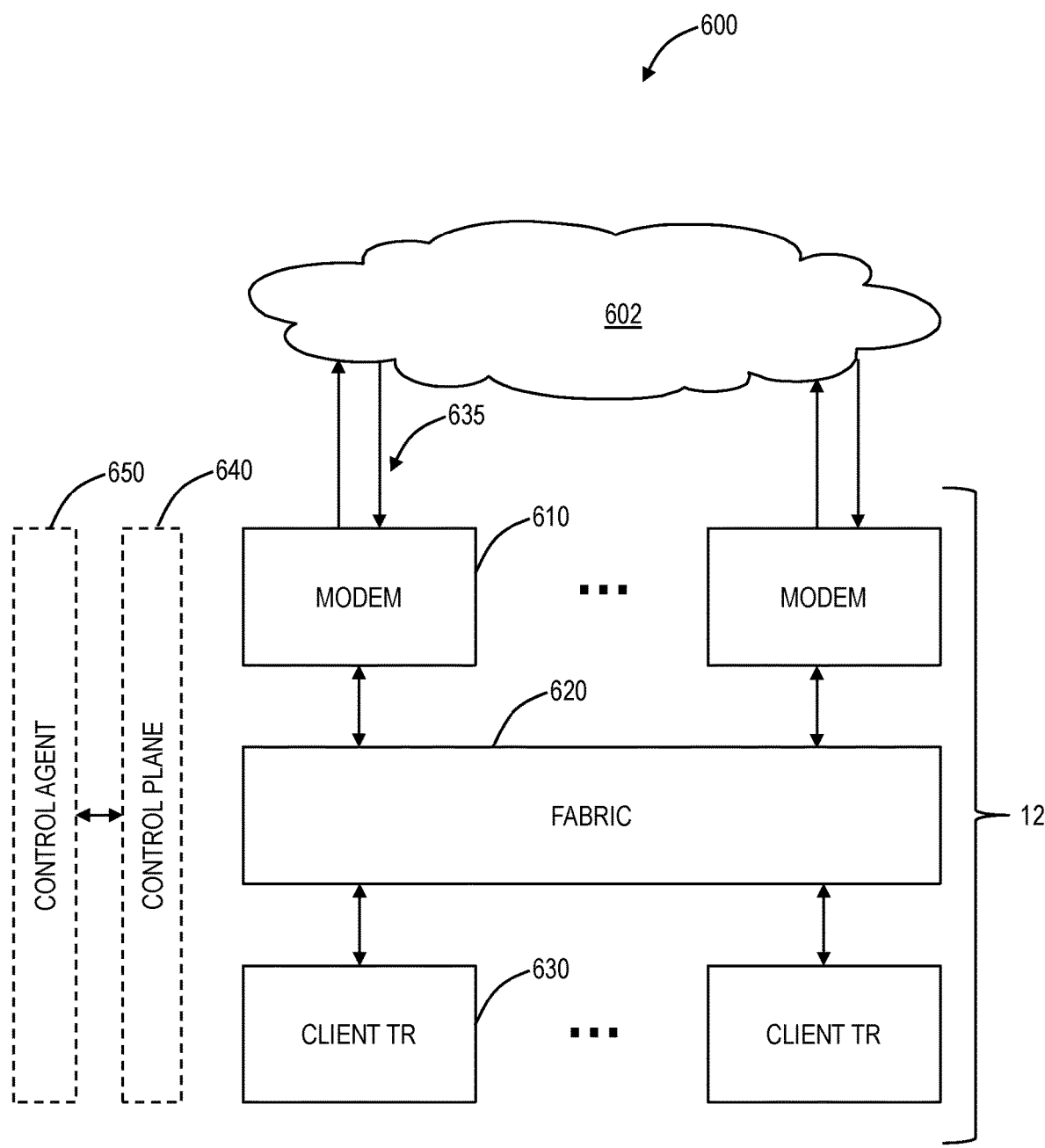
FIG. 8 is a block diagram of a hitless modulation change system at a node connected to an optical network.

Referring to FIG. 8, in an exemplary embodiment, a block diagram illustrates a hitless modulation change system 600 at a node 12 connected to an optical network 602. The node 12 includes one or more modems 610, a fabric 620, and, optionally, one or more client transceivers 630. The modems 610 are flexible optical modems as described herein, and interface optically via a bi-directional connection 635 to the optical network 602. The fabric 620 can include an optical switching fabric (wavelengths), a time division multiplexing (TDM) fabric (OTN, SONET, SDH, etc.), and/or a packet switching fabric (Ethernet, MPLS, IP, etc.). Note, the fabric 620 can be implemented in various different devices for different layers and/or in an integrated manner. Here, in FIG. 8, the fabric 620 is shown as a single logical device for illustration purposes. The fabric 620 is configured to switch wavelengths, channels, timeslots, tributary units, and/or packets between and among the modems 610 as well as the client transceivers 630 (note, in some exemplary embodiments, the client transceivers 630 may be omitted in the node 12). The client transceivers 630 are for local add/drop of connections from the node 12.

The node 12 and the optical network 602 can include a control plane 640. Note, the connections formed through the fabric 620 between and among the modems 610 and/or the client transceivers 630 can be referred to as a data plane. The control plane 640 is a separate management plane to control the connections in the data plane. Again, as described herein, the control plane 640 can include ASON, GMPLS, OSRP, etc., as well as other management mechanisms such as Software Defined Networking (SDN), Path Computation Element (PCE), and the like. That is, the control plane 640 represents any mechanism for automatically allocating the connections within the optical network 602 through the node 12.

As described herein, the node 12 and the modems 610, as flexible optical modems, support variable and flexible modulation schemes meant to maximize optical capacity. For the hitless modulation scheme change systems and methods, the node 12 includes or is communicatively coupled to a control agent 650 with the ability to probe the optical network 602 to determine not only that a change is warranted and acceptable, but also to determine the parameters of the impact of the traffic carrying capability of the channels, and provide a mechanism to perform the change without impacting traffic. Specifically, the control agent 650 can be an autonomous system that coordinates between the modems 610 and the fabric 620 to ensure that any modulation change in a particular modem 610 is hitless to all underlying connections currently on the modem 610. This can be done through rerouting of the underlying connections via the fabric 620 and/or the control plane 640 during a modulation change process, and reverting the underlying connections back to the modem 610 subsequent to completion of the modulation change process. In this manner, the modulation change process is hitless to the underlying connections, the underlying connections are rerouted per existing control plane behavior for restorations, and an end user does not have to manage manually the modulation change process.

The control agent 650 contemplates operation locally or remotely relative to the node 12. In an exemplary embodiment, the control agent 650 is implemented in the controller 500. In another exemplary embodiment, the control agent 650 is implemented in the management system 450 or an SDN controller or application. Various other embodiments are also contemplated. The control agent 650 is communicatively coupled to the modems 610, to the control plane 640, the SDN controller, the management system 450, and/or to the fabric 620. The control agent 650 can be configured to perform various functions described herein, such as determining a modulation change is warranted and supported, determining the impact of the modulation change, causing rerouting of connections impacted by the modulation change, and the like. That is, the control agent 650 implements an autonomous self-optimization of the modems 610 in the optical network 602. Importantly, the control agent 650 works with existing functionality in the optical network 602 and the control plane 640, treating the underlying connections as per standard restoration procedures while a modulation change occurs. In this manner, network behavior is preserved, and the underlying connections are minimally impacted due to the modulation change (i.e., hitless based on the underlying restoration technique).

The approach contemplated herein can be referred to as a bottom-up approach in that a modulation change is determined, and the control agent 650 performs rerouting of the underlying connections first, with the control plane 640, etc., prior to implementing the modulation change. Thus, the modulation change can be implemented safely without impacting the underlying connections, without adjustments at run-time, and without needing to minimize the length of the modulation change. The control agent 650 can be informed once the modulation change is complete and verified, and cause reversion of the underlying connections. The control agent 650 allows a bottom-up approach that is less complex (using existing functionality rather than adding extra functionality), is autonomous, and enables better temporal average spectral efficiency of the modems 610 and the optical network 602. Additionally, the control agent 650 can implement all or part of the methods 100, 200, 300 described herein.

Hitless Modulation Change Method

Figure 9:
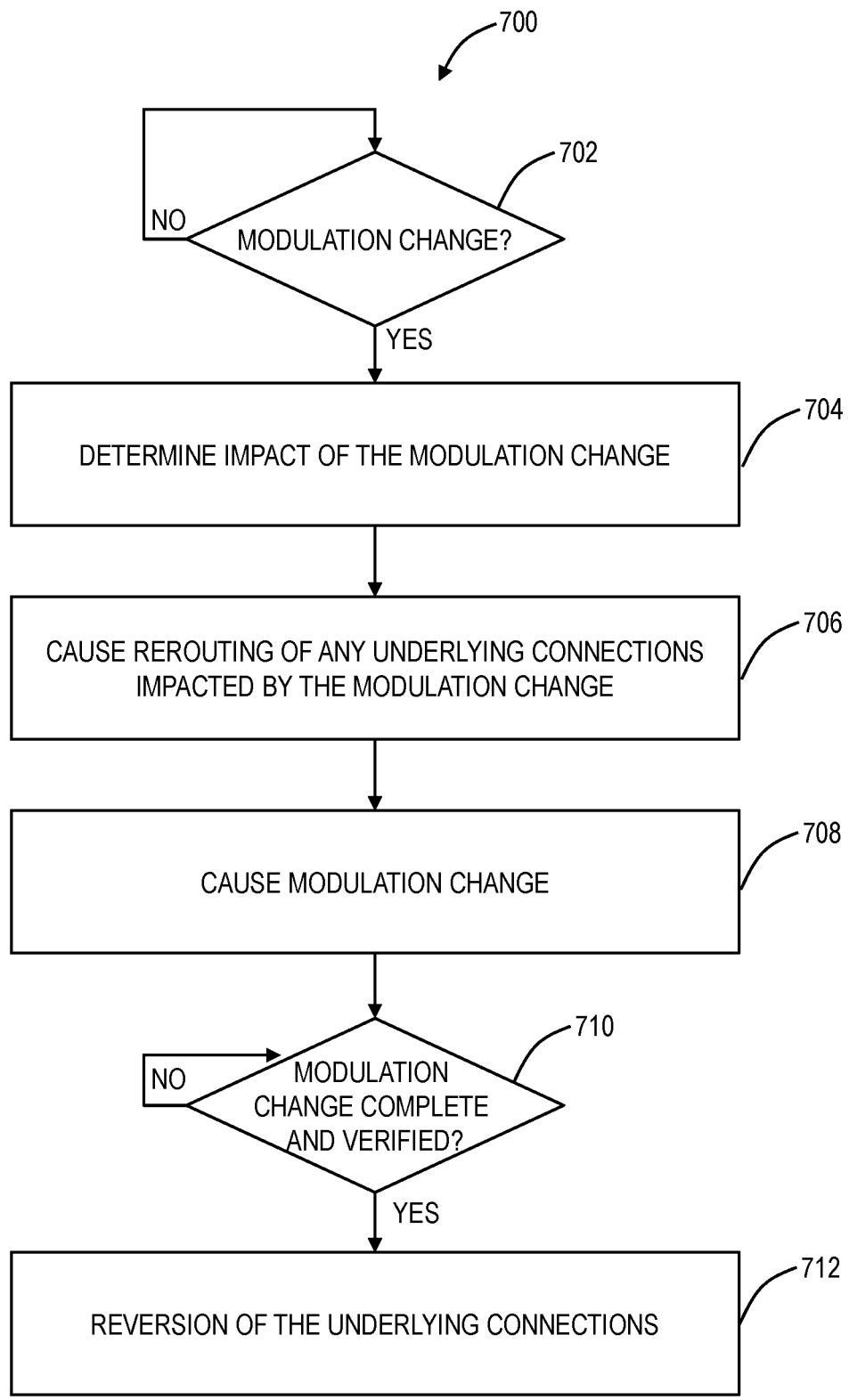
FIG. 9 is a flow chart of a hitless modulation change method which can be implemented through the control agent in coordination with the modem, the control plane, etc. from the hitless modulation change system of FIG. 8.

Referring to FIG. 9, in an exemplary embodiment, a flow chart illustrates a hitless modulation change method 700 which can be implemented through the control agent 650 in coordination with the modem 610, the control plane 640, etc. The hitless modulation change method 700 includes determining that a modulation change is needed on one of the modems 610 (step 702). This determination can be as described herein, e.g. excess margin available, decrease in the margin, etc. Note, the hitless modulation change method 700 is described with reference to a single modem 610; however, the hitless modulation change method 700 can be implemented concurrently for multiple modems 610 as required. The modulation change includes going from a first modulation to a second modulation, and the either the first modulation or the second modulation can provide more capacity, i.e. the modulation change can be an increase or decrease.

The hitless modulation change method 700 includes determining the impact of the modulation change (step 704). The impact includes which underlying connections are affected by the modulation change, a length of time of the modulation change (either estimated or calculated), and the like. Here, the hitless modulation change method 700 can determine which connections will be affected by the modulation change and about how long the modulation change will require. For example, the modem 610 can report a length of time the modulation change will take, based on the first modulation and the second modulation, link conditions, line measurements, etc.

Next, the hitless modulation change method 700 can cause rerouting of any underlying connections which will be impacted by the modulation change (step 706). Note, the hitless modulation change method 700 can also support local buffering of data and retransmission subsequent to completion of the modulation change; however, this is likely complex and costly due to the amount of bandwidth required. The hitless modulation change method 700 can cause rerouting by alerting the control plane 640 of which connections are affected, to allow the control plane 640 to reroute the connections per existing restoration techniques in the optical network 602, and optionally, provide the length of time so the control plane 640 could implement an automatic reversion. Thus, the hitless modulation change method 700 utilizes the control plane 640 to coordinate a data path change in the data plane to accommodate the modulation change without interruption to the data flow.

Note, the rerouting of the underlying connections is per normal restoration techniques which may include mesh restoration via the control plane, 1+1/1:1 Automatic Protection Switching (APS), Subnetwork Connection Protection (SNCP), rings (BLSR, UPSR, etc.), G.8032 Ethernet Ring Protection Switching (ERPS) (ITU-T Recommendation G.8032/Y.1344 (02/12) Ethernet ring protection switching, the contents of which are incorporated by reference herein), Virtual Local Area Network (VLAN) protection, and the like. That is, the control plane can use whatever techniques are currently available in the data plane for rerouting/restoring connections in the event of a fault. Here, the modulation change can be effectively viewed as a future fault that is mitigated in advance, ensuring no traffic impact.

However, a planned change in a channel path, in this case triggered by the desire to change modulation formats, can be much less of a hit, in terms of time, than a restoration/protection event driven by a failure. This is because the failure must be detected before the switch/re-route can take place. By this time, it's already too late, so to speak—as data has already been lost. In the case of a maintenance event, such as in this use case, one can perform what is called a "bridge and roll" where the new path is brought up by duplicating the data across the new path. In this case, even a very simple switch can be used, in which case the data which is "lost" is only due to the differential delay in the two paths. It is also possible to adjust or align to the new path before switching in which case there is no hit whatsoever. Thus, as described herein, the modulation change is hitless or substantially hitless (traffic loss is only due to the differential delay in the two paths which is typically less than 50 ms).

Once all the underlying connections are accounted for, either by rerouting or buffering, the hitless modulation change method 700 includes causing the modulation change (step 708). Here, the control agent 650 can signal to the modem 610 that it can implement the modulation change. The hitless modulation change method 700 waits for the modulation change to complete and verification (step 710). Note, it is expected the modulation change will take from about is to multiple seconds. If there is a failure in the modulation change, the modem 610 can revert back to the first modulation. If there is a success, the modem 610 will operate with the second modulation, and associated components in the modem 610 will adjust and normalize to the line conditions with the second modulation (dispersion, non-linear effects, etc.). Once the second modulation is working, the modem 610 can verify successful operation through various OAM&P parameters such as FEC.

With proper operation of the second modulation or reversion back to the first modulation, the hitless modulation change method 700 can include reversion of the underlying connections back to the modem 610 (step 712). Here, the hitless modulation change method 700 can cause reversion, or the underlying connections can automatically revert such as based on the length of time plus a buffer time. Again, the entire hitless modulation change method 700 can be autonomous meaning it requires no user intervention, and it operates with existing data plane restoration functionality.

SDN Controller/Service for the Application

Figure 10:
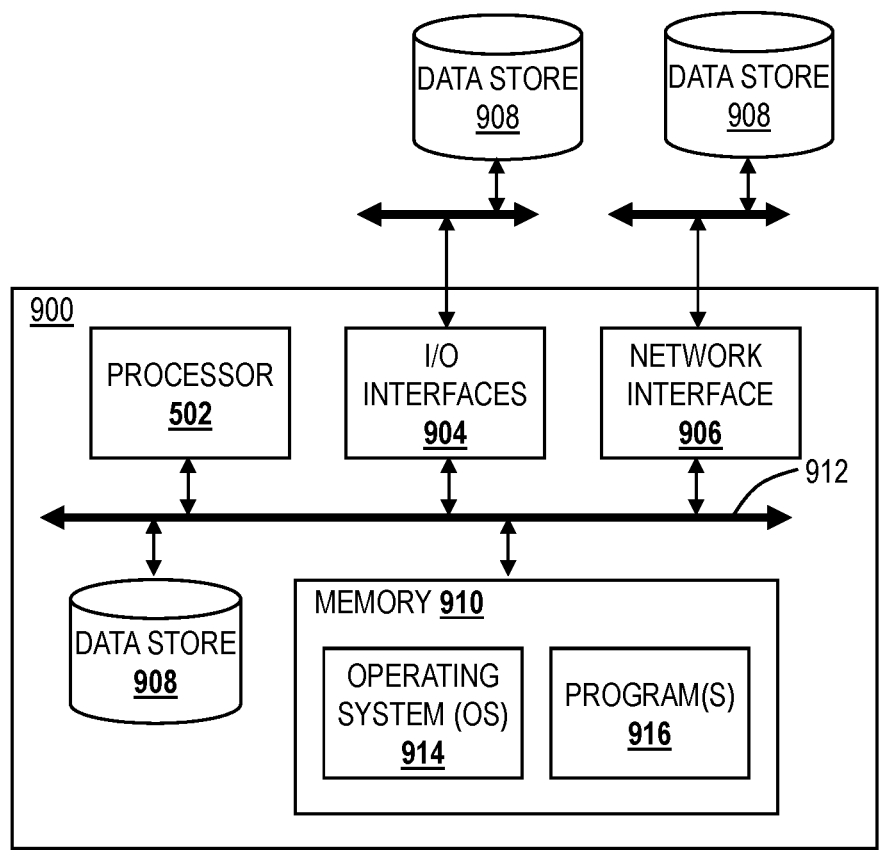
FIG. 10 is a block diagram of a processing device that can operate the control agent from the hitless modulation change system of FIG. 8.

Referring to FIG. 10, in an exemplary embodiment, a block diagram illustrates a processing device 900 that can operate the control agent 650. The processing device 900 can be a digital computer that, in terms of hardware architecture, generally includes a processor 902, input/output (I/O) interfaces 904, a network interface 906, a data store 908, and memory 910. It should be appreciated by those of ordinary skill in the art that FIG. 10 depicts the processing device 900 in an oversimplified manner, and a practical embodiment may include additional components and suitably configured processing logic to support known or conventional operating features that are not described in detail herein. The components (902, 904, 906, 908, and 910) are communicatively coupled via a local interface 912. The local interface 912 can be, for example but not limited to, one or more buses or other wired or wireless connections, as is known in the art. The local interface 912 can have additional elements, which are omitted for simplicity, such as controllers, buffers (caches), drivers, repeaters, and receivers, among many others, to enable communications. Further, the local interface 912 can include address, control, and/or data connections to enable appropriate communications among the aforementioned components.

The processor 902 is a hardware device for executing software instructions. The processor 902 can be any custom made or commercially available processor, a central processing unit (CPU), an auxiliary processor among several processors associated with the processing device 900, a semiconductor-based microprocessor (in the form of a microchip or chip set), or generally any device for executing software instructions. When the processing device 900 is in operation, the processor 902 is configured to execute software stored within the memory 910, to communicate data to and from the memory 910, and to generally control operations of the processing device 900 pursuant to the software instructions. The I/O interfaces 904 can be used to receive user input from and/or for providing system output to one or more devices or components. User input can be provided via, for example, a keyboard, touchpad, and/or a mouse. System output can be provided via a display device and a printer (not shown). I/O interfaces 904 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 906 can be used to enable the processing device 900 to communicate on a network. The network interface 906 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 906 can include address, control, and/or data connections to enable appropriate communications on the network. A data store 908 can be used to store data. The data store 908 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 908 can incorporate electronic, magnetic, optical, and/or other types of storage media. In one example, the data store 908 can be located internal to the processing device 900 such as, for example, an internal hard drive connected to the local interface 912 in the processing device 900. Additionally in another embodiment, the data store 908 can be located external to the processing device 900 such as, for example, an external hard drive connected to the I/O interfaces 904 (e.g., SCSI or USB connection). In a further embodiment, the data store 908 can be connected to the processing device 900 through a network, such as, for example, a network attached file server.

The memory 910 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 910 can incorporate electronic, magnetic, optical, and/or other types of storage media. Note that the memory 910 can have a distributed architecture, where various components are situated remotely from one another, but can be accessed by the processor 902. The software in memory 910 can include one or more software programs, each of which includes an ordered listing of executable instructions for implementing logical functions. The software in the memory 910 includes a suitable operating system (O/S) 914 and one or more programs 916. The operating system 914 essentially controls the execution of other computer programs, such as the one or more programs 516, and provides scheduling, input-output control, file and data management, memory management, and communication control and related services. The one or more programs 916 may be configured to implement the various processes, algorithms, methods, techniques, etc. described herein.

In an exemplary embodiment, processing device 900 can be configured to implement the control agent 650. For example, the processing device 900 can be an SDN controller or another device operating an SDN application in communication with the SDN controller. The processing device 900 can also be a standalone device in communication with the various components in the hitless modulation change system 600. The SDN controller can also include an Application Programming Interface (API) which allows additional applications to interface with the SDN controller for data associated with the optical network 602. In an exemplary embodiment, the control agent 650 can be implemented on the processing device 900 (or on the processing device 900 operating as the SDN controller) and receive data through the API. The processing device 900 can also be a standalone device in communication with the various components in the hitless modulation change system 600. Other configurations are also contemplated.

The processing device 900 can include a queue that performs the hitless modulation change method 700 on one or more of the modems 610. Again, the hitless modulation change systems and methods contemplate operation of the hitless modulation change method 700 for one or more of the modems 610 simultaneously, as appropriate. For example, the modems 610 can be managed based on location in the optical network 602 along with appropriate rules. One exemplary rule may be that only one modem 610 at a time in a node 12 can perform the hitless modulation change method 700, whereas modems 610 in different nodes 12 can perform concurrently. Also, of note, the hitless modulation change method 700 is performed at both ends of a connection simultaneously. The control agent 650 can be a local device that communicates with a peer control agent 650 to coordinate the modulation change. Alternatively, the control agent 650 can have a global view and perform both ends simultaneously, for an optical section.

Figure 11:
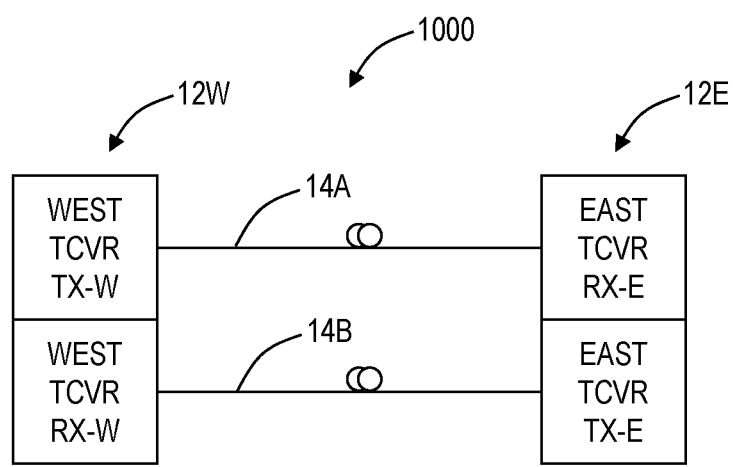
FIG. 11 is a diagram of a high-speed optical system in accordance with the flexible bandwidth adaptation systems and methods.

Referring to FIG. 11, in an exemplary embodiment, a diagram illustrates a high speed optical system 1000 in accordance with the flexible bandwidth adaptation systems and methods. The optical system 1000 includes transceivers 12E, 12W interconnected therebetween by fibers 14A, 14B forming a bidirectional communication link. Specifically, the transceiver 12W includes a transmitter (TX) communicatively coupled to a receiver (RX) on the transceiver 12E via the fiber 14A, and the transceiver 12E includes a TX communicatively coupled to a RX on the transceiver 12W via the fiber 14B. Practical, low-power and cost-effective hardware can only be implemented by leveraging very high levels of optoelectronic integration in the transceivers 12E, 12W, such that the full channel capacity goes through a single hardware block. Further, increasing spectral efficiency of the modulation format necessarily reduces optical unregenerated reach and may reduce available system margins. Transponder implementations that satisfy both high levels of integration, such as the transceivers 12E, 12W, high capacity requirements, and long unregenerated reaches are typically implemented with coherent receivers and electronic signal processing. In an exemplary embodiment, the transceivers 12E, 12W utilize multi-level modulation and electrical signal processing, and also support a plurality of different modulation formats in a same device. Electronic processing of optical signal opens up an opportunity to dynamically change transceiver characteristics such that it can adapt overall throughput capacity and spectral efficiency to link conditions.

Figure 12:
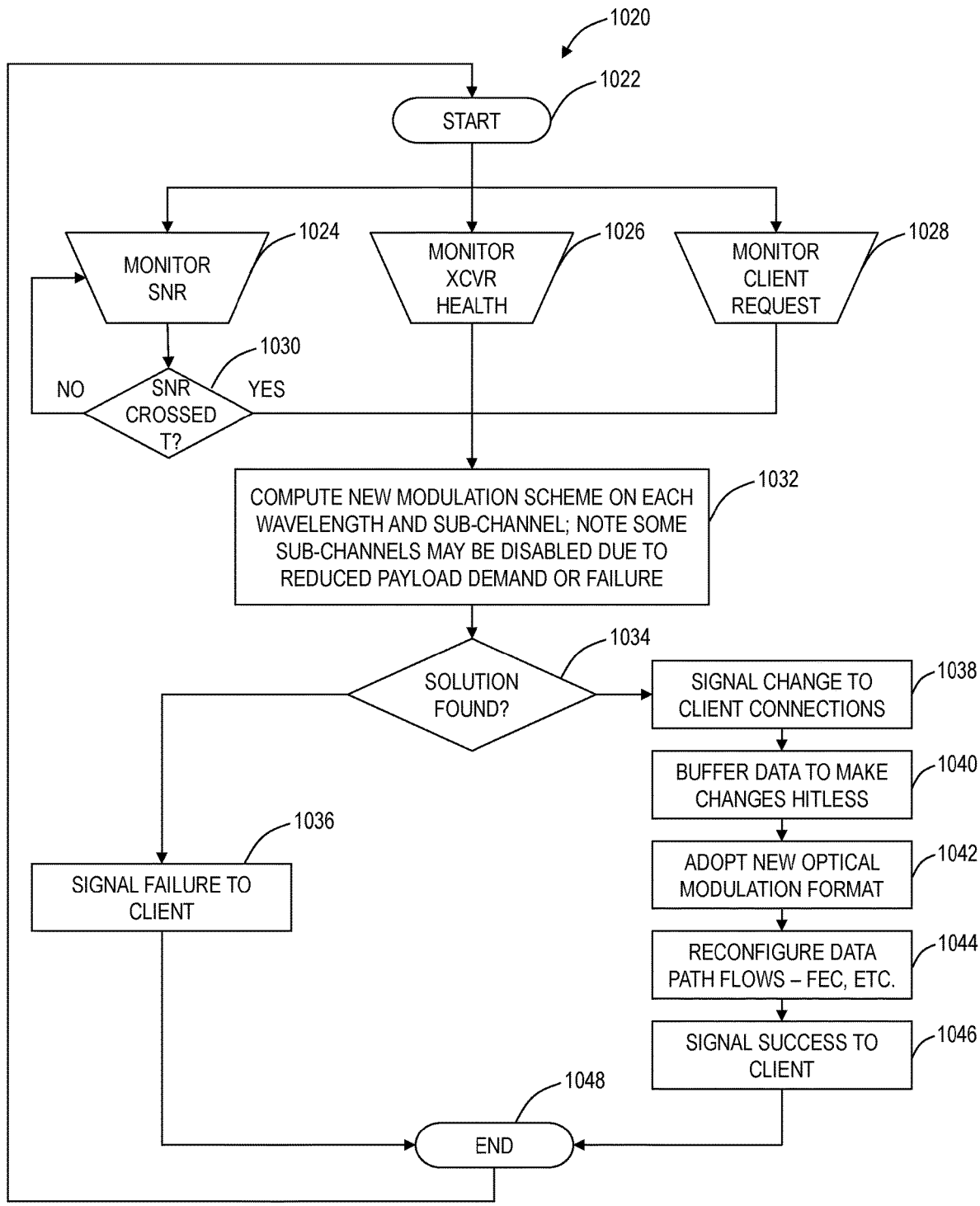
FIG. 12 is a flowchart of a transceiver operation method in accordance with the flexible bandwidth adaptation systems and methods.

Referring to FIG. 12, in an exemplary embodiment, a flowchart illustrates a transceiver operation method 1020 in accordance with the flexible bandwidth adaptation systems and methods. The transceiver operation method 1020 can be implemented on the transceivers 12E, 12W of the optical system 1000. Variously, the transceiver operation method 1020 may continuously operate at/on the transceiver 12E, 12W (step 1022). The transceiver operation method 1020 is configured to continuously monitor SNR (step 1024), transceiver health (step 1026), and client requests (step 1028). For example, the transceiver operation method 1020 may continuously monitor SNR to check if a threshold is crossed (step 1030). Note, in step 1030, the transceiver operation method 1020 checks if the threshold is crossed. The method 1020 can also operate under additional conditions such as SNR increasing above another threshold such that additional bandwidth can be supported through another modulation scheme. That is, generally, the transceiver operation method 1020 is configured to adapt modulation based on SNR changes, both positive and negative. The transceiver operation method 1020 is configured to modify the transceivers (i.e. steps 1034-1048) based on the monitoring steps 1024, 1026, 1028. In an exemplary embodiment, the focus of the method 1020 is on payload size adaptation and framing, and on state bandwidth advertisement to both signal input and output connections, and advertising same to the corresponding clients.

The monitoring steps 1024, 1026, 1028 can include sensing SNR, forward error correction information, signal quality Q, a symbol error rate, and any other optical performance monitoring aspects either directly monitored or computed. In an exemplary embodiment, the method 1020 utilizes SNR, which can be monitored or calculated by various methods, such as an estimate based on forward error correction data. Based on the steps 1024, 1026, 1028, the transceiver operation method 1020 is configured to compute a new, improved modulation scheme on each wavelength and/or sub-channel of the transceiver (step 1032). Of note, the transceiver may include modulation with a plurality of wavelengths and/or sub-channels, and some of the sub-channels may be disabled due to reduced payload demands, failures, etc. The transceiver operation method 1020 checks if a new modulation scheme solution is found (step 1034). If not, the transceiver operation method 1020 signals a failure to a client (step 1036). The failure may also be communicated to a management system, to a far end, etc. using in-band or out-of-band communications. Here, the failure indicates that the transceiver is unable to adapt to a modulation scheme to support currently required conditions at the transceiver, e.g. based on the steps 1024, 1026, 1028.

If a new modulation scheme is found (step 1034), the transceiver operation method 1020 signals a change to client connections (step 1038). The transceiver may also internally buffer data from the clients to make the modulation scheme changes hitless (step 1040). The transceiver adopts the new optical modulation format (step 1042), reconfigures data path flows, such as forward error correction, etc. (step 1044), and signals success to the clients (step 1046). Subsequent to steps 1036, 1046, the transceiver operation method 1020 ends and may return to step 1022 for continual monitoring in the steps 1024, 1026, 1028. Of note, the transceiver operation method 1020 is operated cooperatively at the transceivers 12E, 12W over the optical system 1000.

Assume, for purposes of the foregoing description, the transceiver operation method 1020 is implemented between the transceiver 12W and the transceiver 12E over the fiber 14A, i.e. the transmitter of the transceiver 12W is communicatively coupled to the receiver of the transceiver 12E over the fiber 14A. In a first exemplary scenario associated with the transceiver operation method 1020, link SNR drops on the fiber 14A below a margin acceptable for a current throughput over the fiber 14A. The SNR may be measured in the electrical domain at the receiver on the transceiver 12E. In response, the receiver on the transceiver 12E adapts the channel modulation and reduces overall throughput. This reduced throughput is advertised to the transmitter on the transceiver 12W and to associated clients. In a second exemplary scenario associated with the transceiver operation method 1020, SNR may recover and increase, and here the receiver on the transceiver 12E may adapt channel modulation to increase overall throughput. This increased throughput is advertised to the transmitter on the transceiver 12W and to associated clients.

The first and second exemplary scenarios are associated with step 1024 of the transceiver operation method 1020 and focus on link SNR changing sufficiently to require changes in the optical modulation format, and impacting overall throughput capacity. Fiber-optic link Signal to Noise (SNR) can change for a variety of reasons. Most common are physical fiber bends or kinks, which induce excess optical loss and may affect both Signal Power and Optical Signal to Noise (OSNR) at the receiver. These are frequently observed in metro area networks, where fiber cables share conduits and access space with other electrical, power and sewer services, and, therefore, see frequent maintenance personnel visits. Other reasons may be associated with optical line system failures, e.g. Raman pump failures, control loop software failures, various component failures, etc.

The transceiver operation method 1020 provides an adaptive solution to bandwidth allocation based on a signal-to-noise (SNR) and/or receiver input bit error rate (BER) in the optical system 1000. Any maximum overall throughput is contemplated, and the exemplary embodiments described herein use a 1 Tbps maximum throughput in a given direction. Systems tend to be bi-directional or full-duplex in nature, but that is also not required. In an exemplary embodiment, the transceivers 12E, 12W utilize an electrical signal processor (ESP) based Orthogonal Frequency Division Multiplexed (OFDM) architecture, designed to support ten orthogonal subcarrier channels per wavelength, with each subcarrier supporting a fixed baud rate of 2.8 GBaud. To achieve 1 Tbps of unidirectional throughput, the optical system 1000 is polarization multiplexed on each wavelength (or lambda) and requires five wavelengths in the system to achieve the advertised maximum throughput. In an exemplary embodiment, the optical link 1000 uses a 16-QAM (4-bits/sym or baud) modulation scheme: 2-pols×5-lambdas×10-subC×4-bits/Baud×2.8-Gbaud=1.12 Tbps.

Advantageously, the transceiver operation method 1020 provides adaptive, robust and error-free data transport in the optical system 1000 while experiencing fluctuations in SNR over time and varying widely (e.g., 1 to 15 dB fluctuations). For a fixed symbol rate and a given SNR operating point, the optical system 1000 trades or 'selects' the proper energy per bit setting or spectral efficiency, and data mapping to optimally support a present operating point on the fibers 14, defined by Es/No (i.e., SNR). As the SNR falls, spectral efficiency must follow to maintain a specified network BER operating point. In optical networking, the required BER is generally very, very low (typically $10^{-12}$, $10^{-15}$, etc.). The transceiver operation method 1020 uses channelization and a flexible and reconfigurable, multi-level digital modulation scheme, which allows for the adaptation of capacity in reaction to SNR variation. In an exemplary embodiment, Binary Phase Shift Keying (BPSK), 4-Quadrature Amplitude Modulation (QAM) (note, 4-QAM is also referred to as Quadrature Phase Shift Keying (QPSK)), 8-QAM, 16-QAM, etc. are proposed discrete modulation levels for the fixed 2.8 Gbaud sub-channels, which can be changed to accommodate ~3 dB SNR changes on the line. Additionally, other discrete modulation levels are also contemplated such as ring constellations, 64-QAM and higher, and the like.

Table below illustrates how increasing constellation size increases channel capacity, but also require increasing SNR:

| Modulation Format | Bits/Symbol | Required Es/No (SNR) at $10^{-12}$ BER (dB) |
|---|---|---|
| BPSK | 1 | 14.0 |
| 4-QAM (QPSK) | 2 | 17.5 |
| 8-QAM | 3 | 21.0 |
| 16-QAM | 4 | 24.5 |
| 32-QAM | 5 | 27.5 |
| 64-QAM | 6 | 30.5 |

In a third exemplary scenario associated with the transceiver operation method 1020, a fraction of either of the transceivers 12E, 12W fails. Here, the transceiver operation method 1020 may reconfigure internal connections, reconfigure bandwidth, or, if required, perform a protection switch. First, the transceiver can attempt to reconfigure internal connectivity in such a way as to continue supporting full capacity over the optical system 1000, while bypassing failed hardware. This is possible if there is an excess margin on the optical system 1000. Alternatively, the transceiver can attempt to reduce the throughput as outlined in the transceiver operation method 1020. The third exemplary scenario is associated with step 1026. High-capacity, highly integrated transceivers (such as the transceivers 12E, 12W) can use a parallelized architecture. In an exemplary embodiment, each of the transceivers 12E, 12W uses 2-polarizations×5-lambdas×10-subC×4-bits/Baud×2.8-Gbaud to provide 1.12 Tbps of line side capacity, assuming 16-QAM modulation. It is probable that a failure of a laser, photodetector, electronic circuit block, or an electrical connection will affect only a small fraction of the overall payload capacity in the transceivers 12E, 12W. If such a partial failure occurs and is detected, the transceivers 12E, 12W may reconfigure modulation format, payload flow, etc. and signal changes to the client and a far end if such a failure resulted in an overall loss of payload throughput.

In a fourth exemplary scenario associated with the transceiver operation method 1020, the transceiver can reconfigure bandwidth based on client-side requests (step 1028). The transceiver operation method 1020, in addition to monitoring signal quality and hardware health, can also adapt the optical system 1000 based on operational requirement changes from client facilities, where cost and/or peak use varies due to time of day changes, or end-user demand fluctuations. One such example would be extremely high demand situations that is predictable and known in advance, with an end customer willing to pay a premium for higher performance. Also the converse of this, where certain wavelength services require a lower bandwidth connection for cost savings. In a fifth exemplary scenario associated with the transceiver operation method 1020, the transceiver operation method 1020 can prevent protection switching being performed on a full (e.g., 1 Tbps) data payload.

Figure 13:
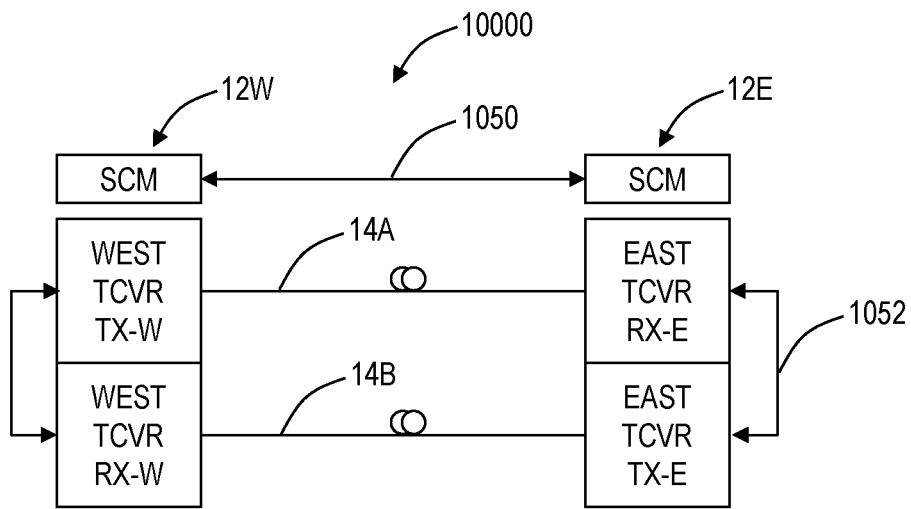
FIG. 13 is a diagram of the optical system of FIG. 11 illustrating communication aspects associated therewith in accordance with the flexible bandwidth adaptation systems and methods.
Figure 14:
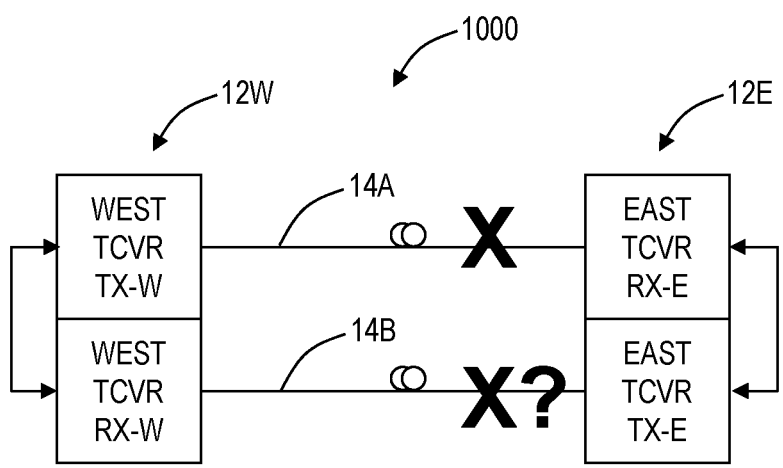
FIG. 14 is a diagram of the optical system of FIG. 11 illustrating an exemplary operation in accordance with the flexible bandwidth adaptation systems and methods.

Referring to FIGS. 13 and 14, in exemplary embodiments, diagrams illustrate the optical system 1000 implementing the transceiver operation method 1020 in accordance with the flexible bandwidth adaptation systems and methods. In particular, FIG. 13 illustrates exemplary communication aspects of the optical system 1000. The transceivers 12E, 12W may have a service channel 1050 therebetween for communications, and each of the transceivers 12E, 12W may have local communications 1052 therebetween as well as communications to subtending clients (not shown). The service channel 1050 may be an in-band or an out-of-band channel. For example, in-band may include overhead associated with Optical Transport Network (OTN), Synchronous Optical Network (SONET), Synchronous Digital Hierarchy (SDH), Ethernet, etc. In-band may also include an optical service/supervisory channel (OSC), etc. Out-of-band may include an overlaid data network, such as User Datagram Protocol (UDP) over Internet Protocol (IP). Accordingly, the transceivers 12E, 12W are configured to communicate operations, administration, maintenance, and provisioning (OAM&P) functionality therebetween. The local communications 1052 mean that the transmitter and receiver on each of the transceivers 12E, 12W are in communication therebetween. This may be through such devices being implemented in the same module, sharing a backplane connection, having a common controller for OAM&P, etc.

FIG. 14 illustrates an exemplary operation of the optical system 1000. In particular, the optical system 1000 of FIG. 14 assumes in-band communication between the transceivers 12E, 12W, i.e. the service channel 1050 is carried over the fibers 14A, 14B. In an exemplary embodiment, the optical system 1000 may include a blind system recovery following a state-change or network anomaly. One of the key features of the optical system 1000 is an ability to change automatically its operating point upon demand, or upon sensing SNR degradation. The optical system 1000 must be able to do this even if the optical link degrades severely for a temporary period. This gives an end user (network provider) a form of 'protection' for some amount of network traffic at various discrete operating points. End-to-end communication is key to ensure robust, verifiable operation after a state change.

For the optical system 1000 and the transceiver operation method 1020, an in-band communication link is ideal for end-to-end modulation mode change signaling, but the optical system 1000 has to recover if that in-band link temporarily becomes degraded or non-functional due to line SNR degradation. Accordingly, the optical system 1000 includes several mechanisms for this so-called blind recovery. Assume the optical system 1000 is normally operating, in a bi-directional topology, at a particular line SNR and associated modulation settings. A Line anomaly occurs and one or both receivers which detect any of a Loss of Frame (LOF), Loss of Multi-frame (LOM), or degraded SNR, causing the in-band communication link to fail. The optical system 10 may include two of the following approaches.

First, upon receiver SNR change detection, or LOF/LOM detection, the receiver commands its associated near-end transmitter to set each sub-channel to a prescribed, but different modulation format and the receiver does the same. Once demodulation is detected on at least one sub-carrier, reestablishment of the in-band communication link can occur, and then can proceed with appropriate full recovery for measured SNR/desired system set-point. Second, upon receiver SNR change detection, or LOF/LOM detection, receiver commands its associated near-end transmitter to set each sub-channel to fixed modulation format, and have transmitter change format once every 'Y' seconds. The receiver will also fix and change at much higher rate 'Y/10' seconds, ensuring receiver can hit all formats within transmitter time interval. Once found, reestablishment of the in-band communication link can occur, and then can proceed with appropriate full recovery for measured SNR/desired system set-point.

In an exemplary embodiment, the transceivers 12E, 12W can each be configured to move to identical modulation formats in a predetermined fashion. Specifically, based on SNR changes (better or worse), the transceivers 12E, 12W can cycle through a predetermined modulation format change cycle. If the receiver cannot recover signal, then the transmitter is stepped to the next modulation format across all sub-channels. For example, the transmitter and receiver can switch between a predetermined set of varied modulation formats for specified periods of time. In another exemplary embodiment, the transmitter and receiver can be configured to switch between a predetermined set of varied modulation formats on different sub-carriers to see which ones work. For Example, sub-carrier 1 to 16 QAM, sub-carrier 2 to 8 PSK, sub-carrier 3 to QPSK, sub-carrier 4 to BPSK, etc. The end points will be able to determine which sub-channels are operable and determine the highest bandwidth option based thereon.

Figure 15:
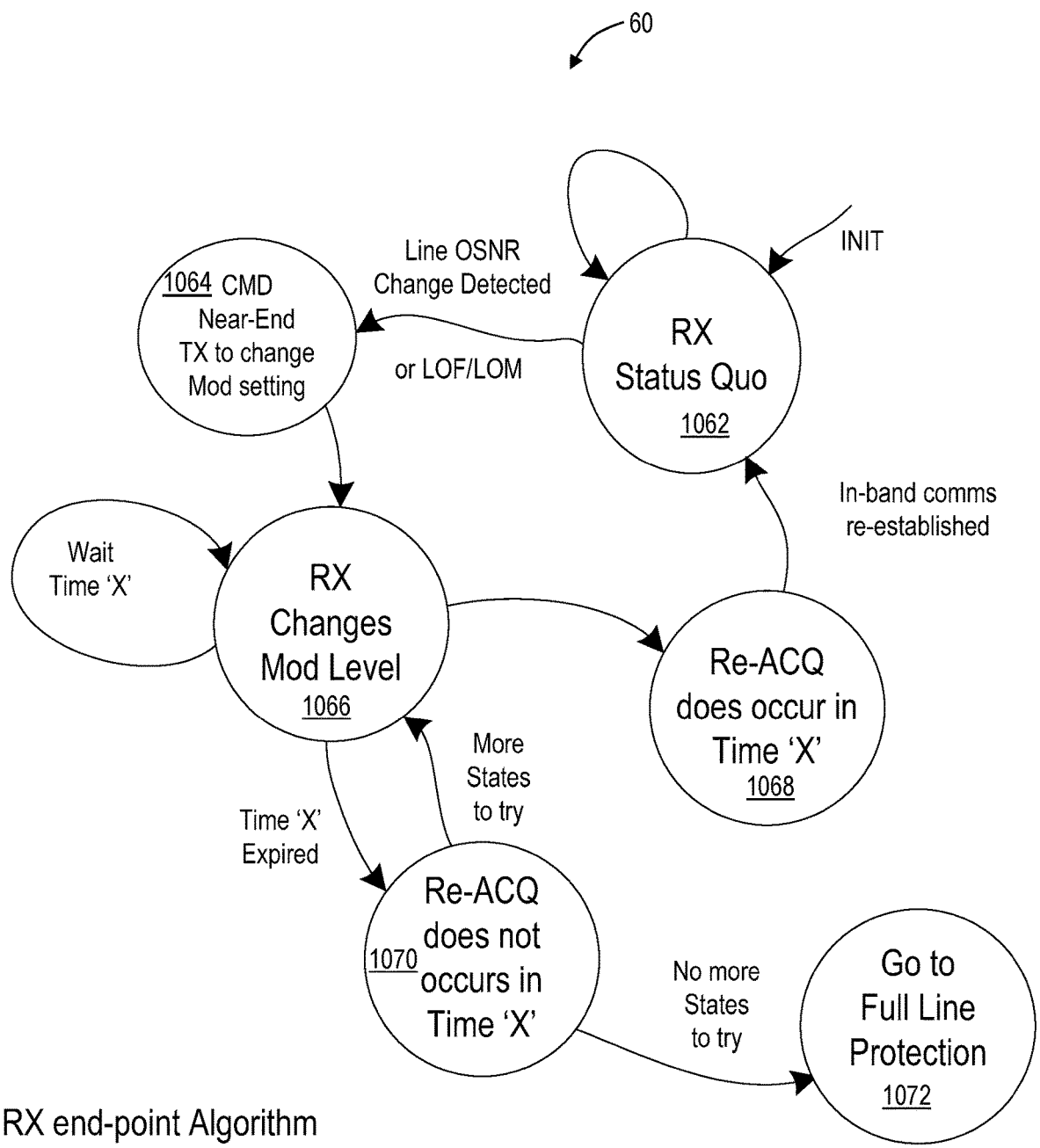
FIG. 15 is a state diagram of a receive-side method for the transceivers of the optical system in accordance with the flexible bandwidth adaptation systems and methods.

Referring to FIG. 15, in an exemplary embodiment, a state diagram illustrates a receive-side method 1060 for the transceivers 12E, 12W in accordance with the flexible bandwidth adaptation systems and methods. The receive-side method 1060 is implemented in the receiver of the transceivers 12E, 12W for maintaining an in-band communication link with a far-end transmitter. The receive-side method 1060 includes states 1062-1072 and associated transitions therebetween. First, a state 1062 is a receiver operating normally, i.e. 'status quo.' The receiver may be initialized to this state and may operate continually in this state under normal operation. If the receiver experiences an SNR change, LOF/LOM, etc., the receiver may enter a state 1064 where the receiver commands its associated near-end transmitter to change its modulation setting. Note, entry to the state 1064 assume loss of in-band communications. The receiver proceeds to a state 1066 where the receiver changes its modulation levels and waits a predetermined time, X. From the state 1066, if reacquisition occurs within the predetermined time, to state 1068, then in-band communication is reestablished and the receiver proceeds back to the state 1062. If the reacquisition does not occur with the predetermined time, the receiver enters a state 1070 and the receiver either has more states to try (i.e., modulation states) and proceeds back to the state 1066 to retry, or the receiver has failed with all states, and the receiver goes to a state 1072 where the receiver must go to a line protection.

Figure 16:
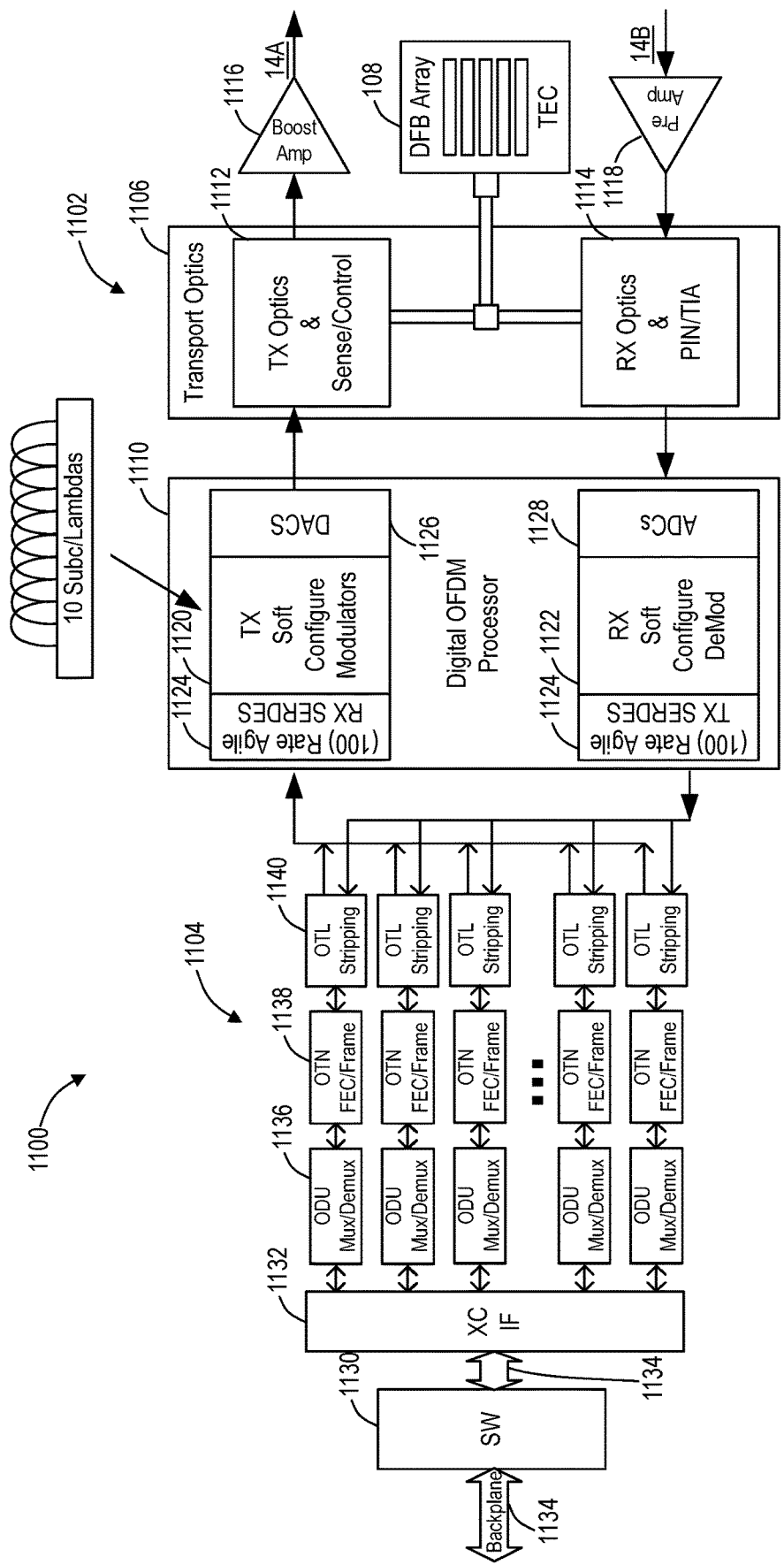
FIG. 16 is a block diagram of an exemplary implementation of a transceiver for use in the optical system and/or with the transceiver operation method.

Referring to FIG. 16, in an exemplary embodiment, a block diagram illustrates an exemplary implementation of a transceiver 1100 for use in the optical system 1000 and with the transceiver operation method 1020. For example, the transceivers 12E, 12W may include the transceiver 1100. The transceiver 1100 includes both an optical section 1102 and a data section 1104. The optical section 1102 is generally configured to implement functions related to modulation scheme change and the like and the data section 1104 is generally configured to implement bandwidth adaptation based thereon. The optical section 1102 includes transport optics 1106, a distributed feedback laser (DFB) array 1108 coupled to the transport optics 1106, and a digital OFDM processor 1110. The DFB array 1108 can include a plurality of wavelengths for modulation/demodulation thereon by the transport optics 1106, and a thermoelectric cooler (TEC) for maintaining wavelength control.

The transport optics 1106 include a transmitter optics section 1112 with sensing and control and a receiver optics section 1114 with a PIN diode and a transimpedance amplifier (TIA). The transmitter optics section 1112 can connect to a boost/post amplifier 1116 that may be coupled to the fiber 14A, and the receiver optics section 1114 can connect to a pre-amplifier 1118 that may be coupled to the fiber 14B. The digital OFDM processor 1110 includes configurable modulators 1120 and configurable demodulators 1122. The modulators 1120 and the demodulators 1122 are configured to implement the changing of the modulation schemes as described herein. The modulators 1120 and the demodulators 1122 are configured to communicate with the data section 1104 through a rate agile serializer/deserializer (SERDES) 1124. The modulators 1120 are configured to communicate with the transmitter optics section 1112 through digital-analog converters (DACs) 1126. The demodulators 1122 are configured to communicate with the receiver optics section 1114 through analog-digital converters (ADCs) 1128. The demodulators 1122 can be configured to sense/monitor line SNR for communication to a far-end transceiver 1100 for adjustments based thereon.

In an exemplary embodiment, the data section 1104 utilizes Optical Transport Network (OTN), but those of ordinary skill in the art will recognize any protocol is contemplated herewith. The data section 1104 can include an OTN mux/demux framer that can interface to a switch 1130 for data to exchange with the optical section 1102. For example, the switch 1130 can include a packet switch, a time division multiplexing (TDM) switch, etc., and can be communicatively coupled to a cross-connect (XC) interface 1132 in the data section 1104 through a backplane 1134 or the like. From the XC interface 1132, the data section 1104 includes a plurality of lanes each with an Optical channel Data Unit mux/demux 1136, an OTN FEC/framer 1138, and an OTL stripping block 1140. In operation, the various components of the data section 1104 are configured to interface an amount of bandwidth as required to the optical section 1102.

In an exemplary embodiment, the transceiver 1100 is a 280 Gbps to 1.12 Tbps SNR-driven adaptive optical transport system. The transmitter optics section 1112 can support five polarization multiplexed wavelengths×ten sub-channels per wavelength at 2.8 GBaud per sub-channel. The modulators/demodulators 1120, 1122 are digital, programmable modem that can support BPSK, QPSK, 8-QAM, and 16-QAM. Bandwidth in the transceiver 1100 can be reconfigured in 2.8 Gbps increments as needed or dictated by SNR. With BPSK, one-bit/baud symbol is provided for 2.8 Gbps/sub-ch=280 Gbps (ten sub-channels). With QPSK, two-bit/baud symbol is provided for 5.6 Gbps/sub-ch=560 Gbps (ten sub-channels, 5 wavelengths). With 8-QAM, three-bit/baud symbol is provided for 8.4 Gbps/sub-ch=840 Gbps (ten sub-channels, 5 wavelengths). With 16-QAM, four-bit/baud symbol is provided for 11.2 Gbps/sub-ch=1120 Gbps (ten sub-channels, 5 wavelengths). For the data section 1104, 1120 Gbps: 10×112 Gbps can be carried as an Optical channel Transport Unit level 4 (OTU4) per wavelength, 840 Gbps: 10×84 Gbps can be carried as an OTU3.x per wavelength, 560 Gbps: 10×56 Gbps can be carried as an OTU3.y per wavelength, and 280 Gbps: 10×28 Gbps can be carried as an OTU2.y per wavelength. Note, the foregoing describes the transceiver 100 with non-standard OTN rates (28 G, 56 G, 84 G, etc.) for illustration purposes, but the flexible bandwidth adaptation systems and methods contemplate using standard OTN rates (OTU2/10 G, OTU3/40 G, OTU4/100 G, etc.) or any other rates. Also, along with transport container rates, those of ordinary skill in the art will recognize there is no limitation on modulation formats or overall throughput rate as well. The exemplary embodiments described herein are provided as illustrative examples.

Figure 17:
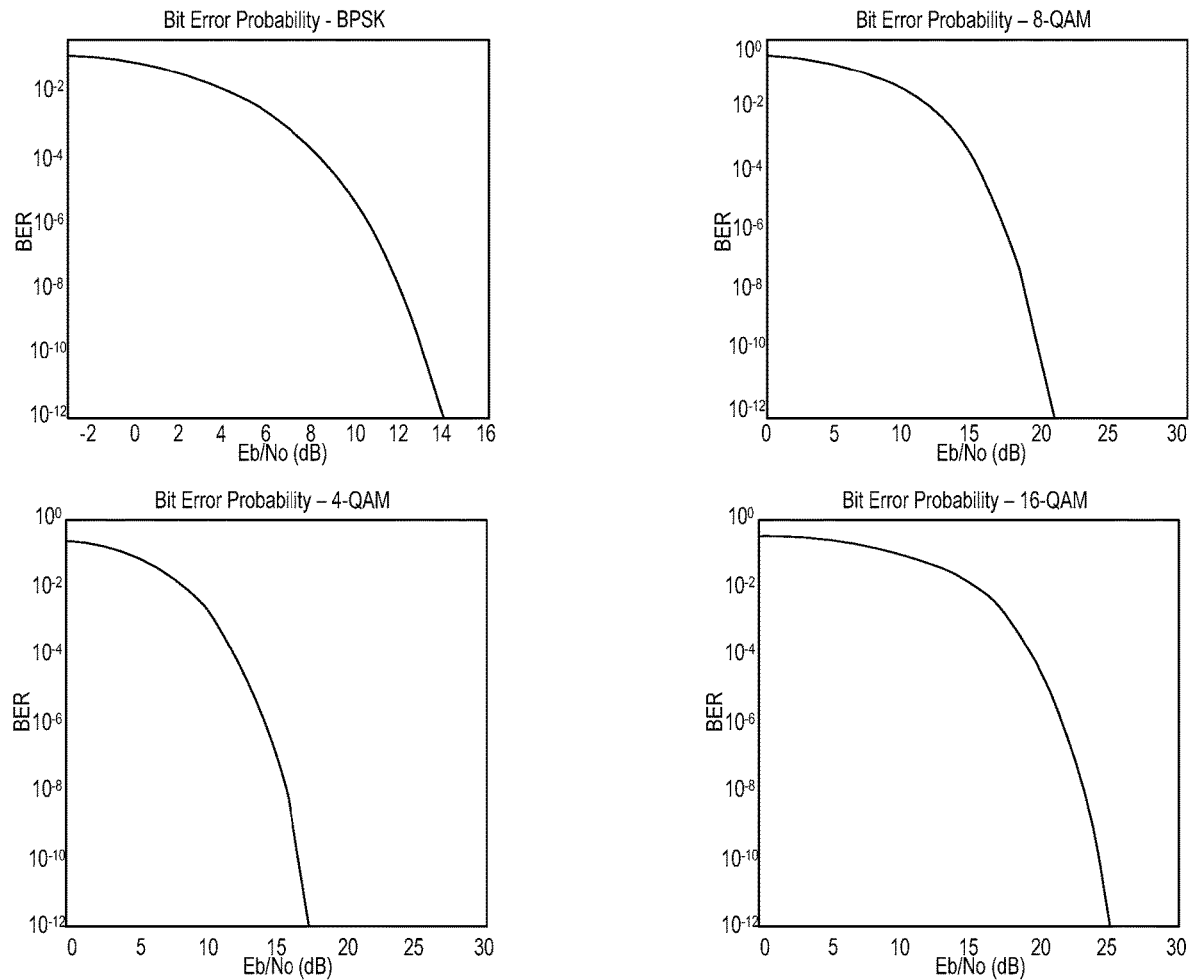
FIG. 17 is a set of graphs of symbol error rate versus signal-to-noise ratio (SNR) at a bit error rate (BER) of $10^{-12}$ for the transceiver of FIG. 16.

Referring to FIG. 17, in an exemplary embodiment, graphs illustrate symbol error rate versus SNR at BER of $10^{-12}$ for the transceiver 1100. From these graphs and the table of modulation formats described herein, it is shown that approximately 3 dB is required for SNR at each step in the modulation scheme.

Figure 18:
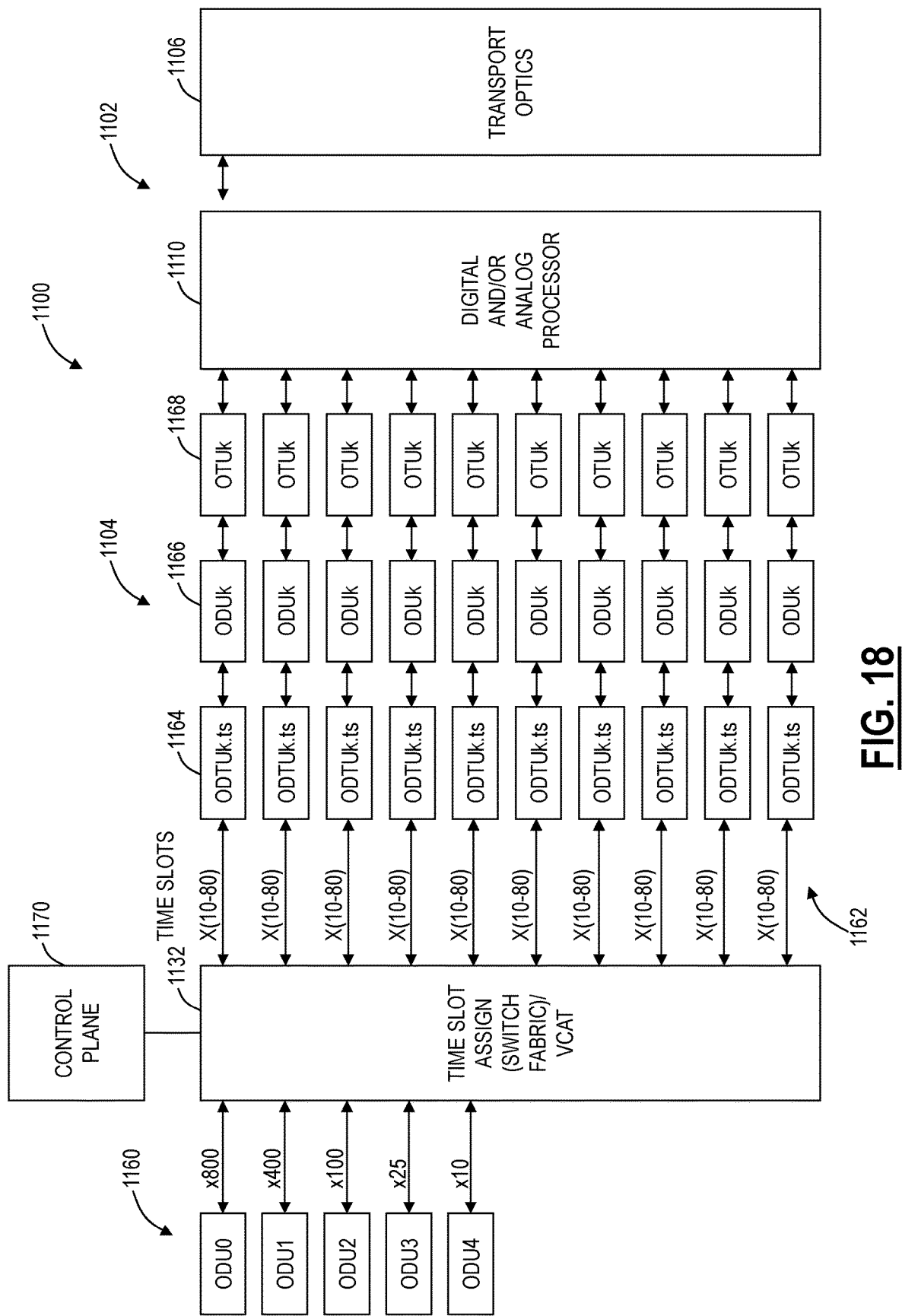
FIG. 18 is a block diagram of the transceiver of FIG. 16 focusing on the data section and time slots associated therewith.

Referring to FIG. 18, in an exemplary embodiment, a block diagram illustrates the transceiver 1100 focusing on the data section 1104. In an exemplary embodiment, the transceiver 1100 uses OTN transport supporting non-standard rates with ODU and ODUflex multiplexing. Mapping and timeslot assignments are performed and managed by the switch 1132 with asynchronous mapping protocol (AMP), Generic Mapping Protocol (GMP) and Generic Framing Protocol-Frame (GFP-F) mappings if required. On a client-side of the transceiver 1100, the transceiver 1100 can support various tributary types and rates, such as standard ODU(0/1/2/3/4) tributaries, ODUFlex(Constant Bit Rate (CBR)) and ODUFlex(GFP) for TDM and Packet-based traffic.

In an exemplary embodiment, the transceiver 1100 supports a variable number of timeslots in the digital section 1104 based on settings in the optical section 1102. For example, a single timeslot may be approximately 1.25 Gbps, and the transceiver 1100 can support four discrete bandwidth settings based on SNR, demand, etc. The four discrete bandwidth settings can include 800 Timeslots, or 1.12 Tb/s aggregate bandwidth at the highest SNR (16 QAM); 600 Timeslots, or 0.840 Tb/s aggregate bandwidth at a level of the maximum SNR minus 3.5 dB (8-PSK); 400 Timeslots, or 0.560 Tb/s aggregate bandwidth at a level of the maximum SNR minus 7 dB (QPSK); and 200 Timeslots, or 0.280 Tb/s aggregate bandwidth at a level of the maximum SNR minus 10 dB (BPSK). In particular, data units 1160 may include 800 ODU0s, 400 ODU1s, 100 ODU2s, 25 ODU3s, 10 ODU4s, or combinations thereof for the 100-800 timeslots.

The data units 1160 are managed by the interface 1132 which is coupled to ten output lines 1162, each of which includes 10 to 80 timeslots. The output lines 1162 are coupled to OTN framing/deframing circuitry 1164, 1166, 1168 which interfaces the 10 to 80 timeslots to the digital OFDM processor 1110 for transmission thereof. In an exemplary embodiment, mapping ODUk signals from the data units 1160 to line port time slots directly can be used when all OTUk framers 1164, 1166, 1168 are set to an identical number of time slots and Multi-frame Alignment Signal (MFAS) is aligned. In another exemplary embodiment, mapping ODUk signals from the data units 1160 to line port time slots using Virtual Concatenation (VCAT) to stripe ODUj's across multiple OTUk framers 1164, 1166, 1168 with varied number of time slots and random MFAS alignments.

In an exemplary embodiment, a control plane 1170 may be utilized with the transceiver 1170 for bandwidth advertisement and control thereof. Generally, the control plane 1170 includes software, processes, algorithms, etc. that control configurable features of a network, such as automating discovery of network elements, capacity on the links, port availability on the network elements, connectivity between ports; dissemination of topology and bandwidth information between the network elements; calculation and creation of paths for connections; network level protection and restoration; and the like. In an exemplary embodiment, the control plane 1170 may utilize Automatically Switched Optical Network (ASON) as defined in G.8080/Y.1304, Architecture for the automatically switched optical network (ASON) (02/2005), the contents of which are herein incorporated by reference, and the like. In another exemplary embodiment, the control plane 1170 may utilize Generalized Multi-Protocol Label Switching (GMPLS) Architecture as defined in Request for Comments: 3945 (10/2004), the contents of which are herein incorporated by reference, and the like. In yet another exemplary embodiment, the control plane 1170 may utilize Optical Signaling and Routing Protocol (OSRP) from Ciena Corporation of Linthicum, Md. which is an optical routing protocol similar to PNNI (Private Network-to-Network Interface) and MPLS (Multiprotocol Label Switching). Those of ordinary skill in the art will recognize the network and the control plane may utilize any type control plane for with the transceiver 1100 and the flexible bandwidth adaptation systems and methods.

For advertising bandwidth availability, the control plane 1170 can map sub-network connections (SNC) to individual or groups of time slots on the transceiver 1100. Since each time slot carries approximately 1.25 Gbps, multiple times slots can be used to cover SNCs requiring more than 1.25 Gbps. The transceiver 1100 can be configured to advertise the availability of time slots to the control plane 1170. For example, time slots can be advertised as 1-800 available for 1 Tbps; 1-600 available for 750 Gbps; 1-400 available for 500 Gbps; 1-200 available for 250 Gbps; 1-10, 21-30, 101-110, 121-130, 201-220, 241-260, 401-440 and 481-500 for 200 Gbps; or any other combination. Additionally, the transceiver 1100 can advertise impending changes in the availability of time slots. For example, if the SNR monitor detects a falling SNR, the transceiver 1100 can warn that time slots 401 to 800 will not be available soon.

Referring to FIGS. 19-23, in exemplary embodiments, end-to-end bandwidth operations are illustrated in accordance with the flexible bandwidth adaptation systems and methods. In network deployments, network paths containing endpoints and one or more intermediate nodes (e.g., regenerators), the bandwidth of the path is limited by the lowest bandwidth section. Thus, all nodes in the path have to adjust their throughput to match the lowest throughput section. As long as the current modulation format on an individual section can support the path throughput, the modulation format does not have to change. If an increase in path throughput is desired, all sections can be checked for SNR to determine if a modulation format change will allow additional throughput. Coordinating modulation changes along the path will minimize traffic interruption. When a single section has to drop bandwidth by a modulation change, the path can quickly adapt by signaling this change to all nodes in the path. When one or more sections require a modulation change to increase bandwidth, the path can quickly adapt by signaling this change to all nodes in the path.

In an exemplary embodiment, the flexible bandwidth adaptation systems and methods can include a method of resizing line path bandwidth using a Link Capacity Adjustment (LCAS)-like protocol. Here, Differential Delay Compensation is not required. As described herein, the transceiver 1100 payload areas are divided into time slots, and bandwidth affects the number of available time slots. For Bandwidth Adjustment, requests to increase or decrease the number of time slots are passed between interfaces using communications channels, e.g. an out-of-band service channel, in-band service channel (note, this requires automatic TX and RX modulation alignment so that the in-band service channel can be demodulated and decoded). Also, originating, terminating, and intermediate equipment must participate in the method of resizing line path bandwidth. Note, the intermediate equipment may or may not be present.

The method of resizing line path bandwidth can include Bandwidth Control Overhead (BWCOH) exchanged between the originating, terminating, and intermediate equipment. The BWCOH can include commands of increment (INC) (add subchannel(s) time slot(s)), decrement (DEC) (remove subchannel(s) time slot(s)), normal (NRML) (take action from previous increment or decrement command), and available (for subchannel(s) list maximum supported time slots based on the control plane 1170). The BWCOH can have a direction flow of forward (FWD) (from originating node to terminating node) and backward (BWD) (from terminating node to originating Node). Additionally, the BWCOH can include status, OK (command can be supported) or failed (command cannot be supported), a sub-channel bit field, a set Bit for each channel addressed in the command, sub-channel time slots, 80/40/20/10/0, and error checks (CRC over BWCOH).

In an exemplary embodiment, the originating nodes can generate FWD increment and FWD decrement commands (along with available and normal commands); generate FWD decrement command when receiving a BWD decrement command; and generate NRML command after generating FWD Increment, decrement and available command and receiving the matching BWD command. The intermediate nodes can generate BWD backward decrement command, pass FWD commands and adjust status and time slots as required, and pass BWD commands noting status and time slots. The terminating nodes can generate backward decrement command, and generate BWD command when receiving FWD command noting status and time slots and adjusting status and time slots as required.

Figure 19:
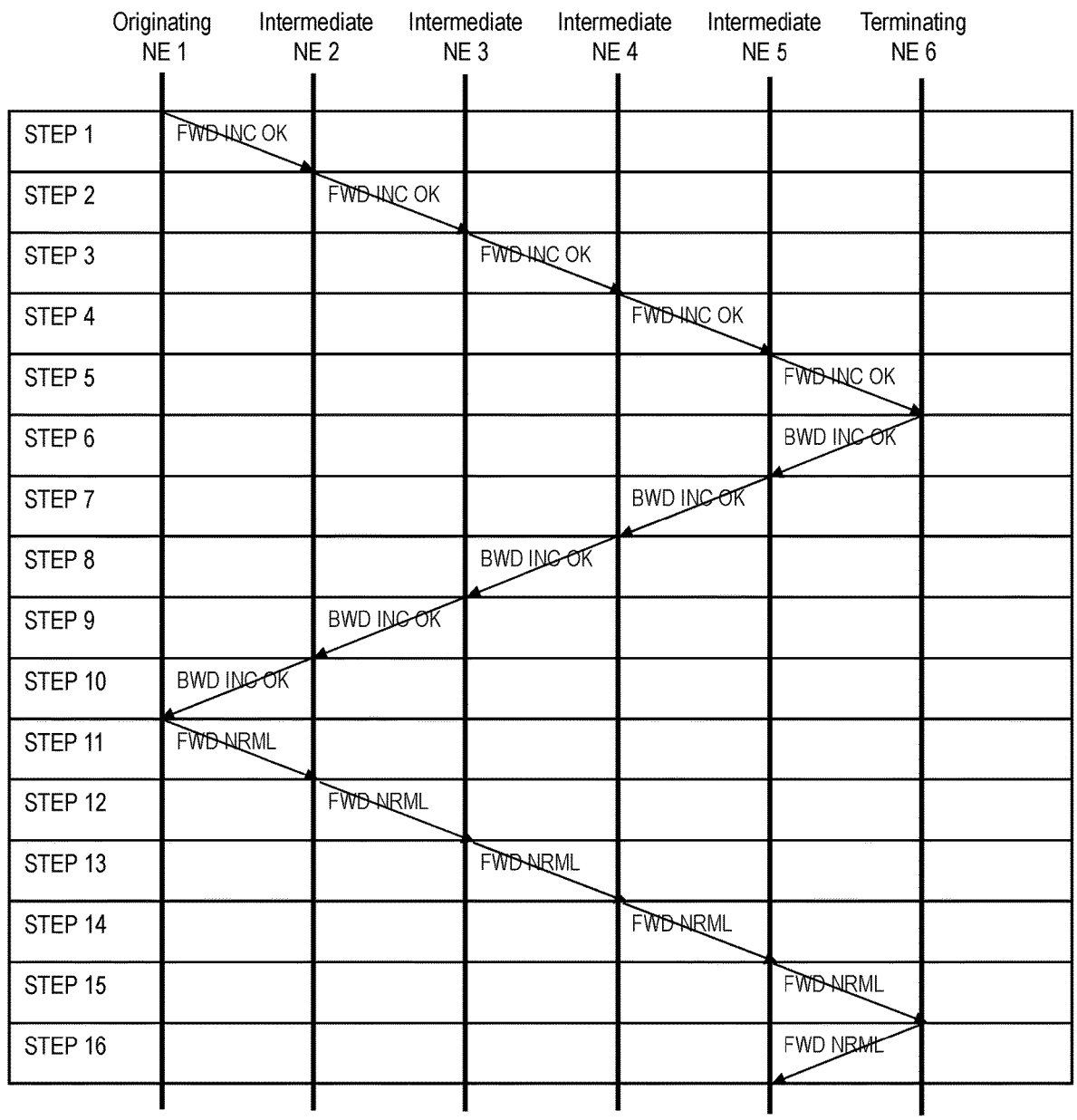
FIGS. 19-23 are diagrams of end-to-end bandwidth operations between originating, intermediate, and terminating network elements in accordance with the flexible bandwidth adaptation systems and methods.

FIGS. 19-23 are end-to-end bandwidth operations using the method of resizing line path bandwidth. Here, there is an originating network element (NE) 1, four intermediate network elements 2-5, and a terminating network element 6. FIG. 19 is an example of the originating NE requesting increment in bandwidth. Only originating NEs can request increment in time slots (adjust modulation for more bandwidth). In Step 1, the originating NE Sends CMD FWD INCR with Status=OK and sub-channel(s) and time slot(s) identified. In Step 2-5, intermediate NE's check SNR and verify that a bandwidth increment is OK and pass the FWD command along. In Step 6, the terminating NE checks SNR and verifies that increment is OK and generate BWD command along with same contents as received FWD command. In Steps 7-10, the intermediate NEs pass the BWD command along noting that status is OK. In Step 11, the originating NE sends a normal command and since the received increment command status was OK, increases time slots on addressed sub-channels. In Steps 12-15, upon receiving the normal command, the intermediate NEs pass through the normal command, since the received increment command status was OK, increases time slots on addressed sub-channels. In Step 16, upon receiving the normal command, the terminating NE generates the normal command, and since the received increment command status was OK, increases time slots on addressed sub channels.

Figure 20:
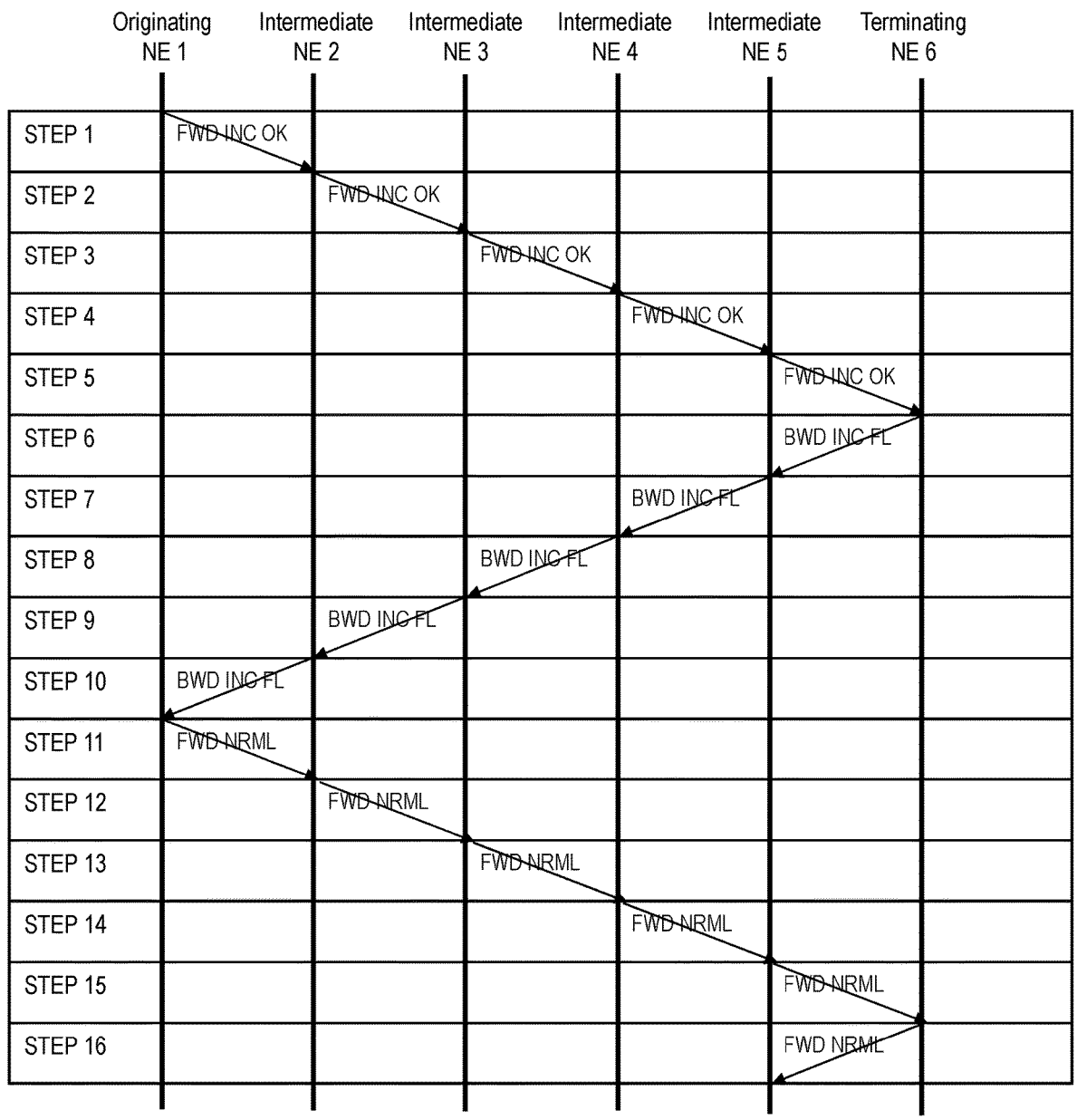

FIG. 20 is an example of the originating NE requesting incremental bandwidth where the request for additional time slots cannot be accommodated at the terminating NE. In Step 1, the originating NE Sends CMD FWD INCR with Status=OK and sub-channel(s) and time slot(s) identified. In Step 2-5, intermediate NE's check SNR and verify that a bandwidth increment is OK and pass the FWD command along. In Step 6, the terminating NE checks SNR and determines it cannot increase bandwidth, and changes the status field to Failed and sends a backward command with Stat=Failed. In Steps 7-10, Intermediate NEs pass the BWD command along noting that status is failed. In Step 11, the originating NE sends a normal command and since the received command increment status was Failed, no time slot changes are made. In Steps 12-15, upon receiving the normal command, the intermediate NEs pass through the normal command and since the received increment command status was Failed, no time slot changes are made. In Step 16, upon receiving the normal command, the terminating NE generates the normal command and since the received increment command status was Failed, no time slot changes are made.

Figure 21:
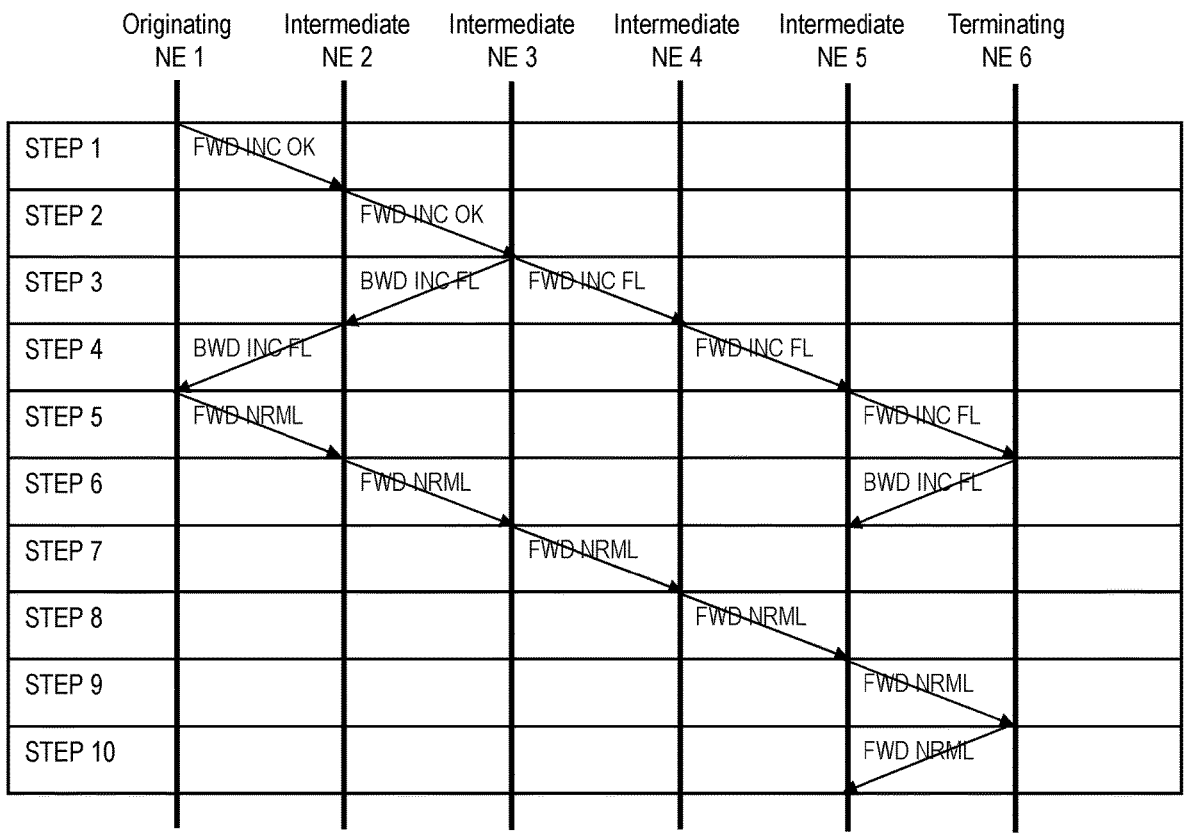

FIG. 21 is an example of the originating NE requesting incremental bandwidth where the request for additional time slots cannot be accommodated at one of the intermediate NEs. In Step 1, the originating NE Sends CMD FWD INCR with Status=OK and sub-channel(s) and time slot(s) identified. In Step 2, the intermediate NE 2 check SNR and verifies that the increment is OK and passes FWD command along. In Step 3, the intermediate NE 3 checks SNR and determines it cannot increase bandwidth, and changes Status field to Failed and sends backward and forward commands with Stat=Failed. In Step 4, the intermediate NE passes BWD command along noting that status is failed. In Steps 4-5, the intermediate NEs pass FWD command along noting that the status is failed. In Step 5, the originating NE sends a normal command and since the received command increment status was Failed, no time slot changes are made. In Steps 6-9, upon receiving the normal command, the intermediate NEs pass through the normal command and since the received increment command status was Failed, no time slot changes are made. In Step 10, upon receiving the normal command, terminating NE generates the normal command and since the received increment command status was Failed, no time slot changes are made.

Figure 22:
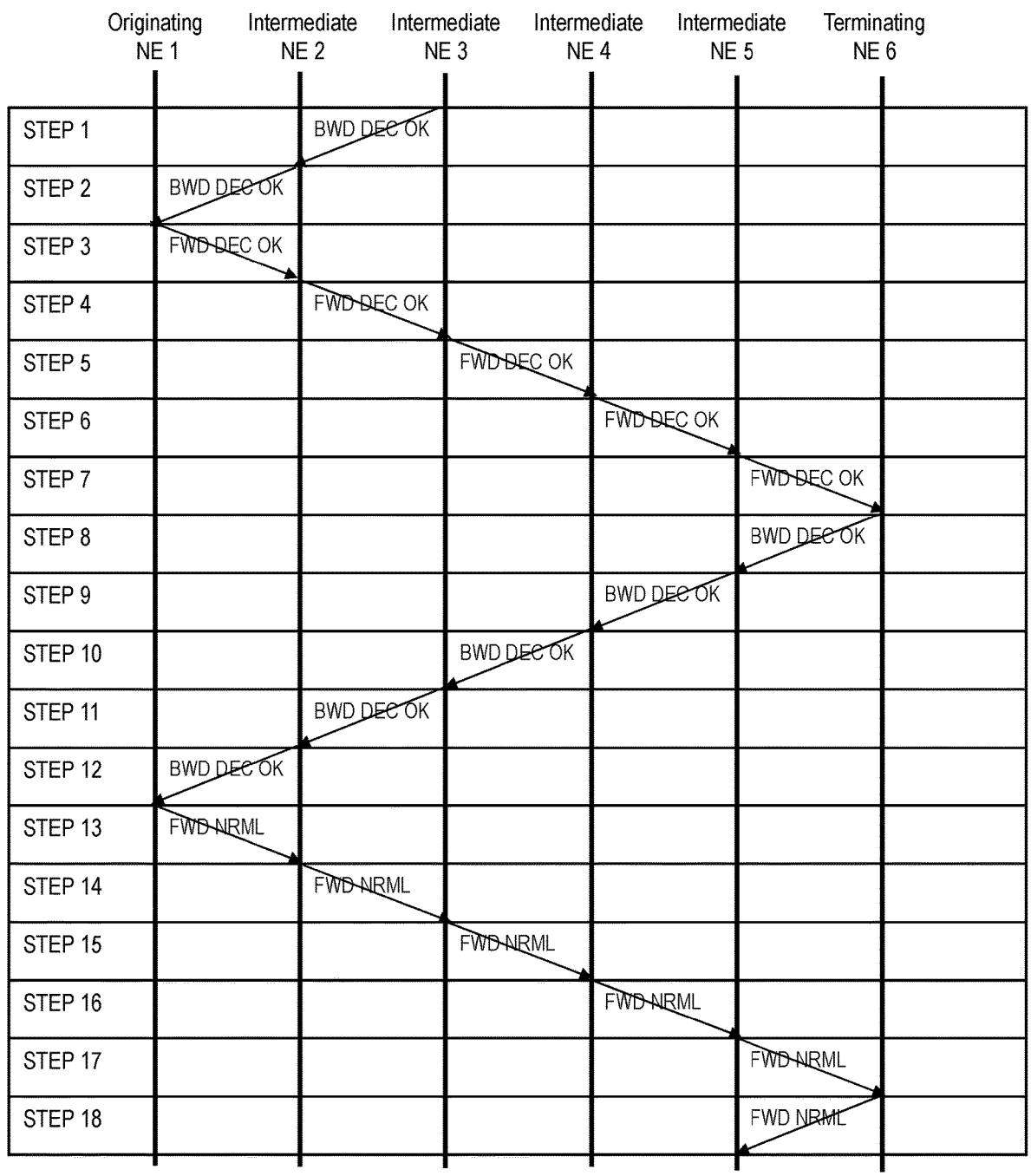

FIG. 22 is an example of any node requesting a decrement in time slots, i.e. adjusting modulation for less bandwidth. In normal command and since the received DEC command status was OK, decrements times slots and adjusts modulation formats on addressed sub channels.

Figure 23:
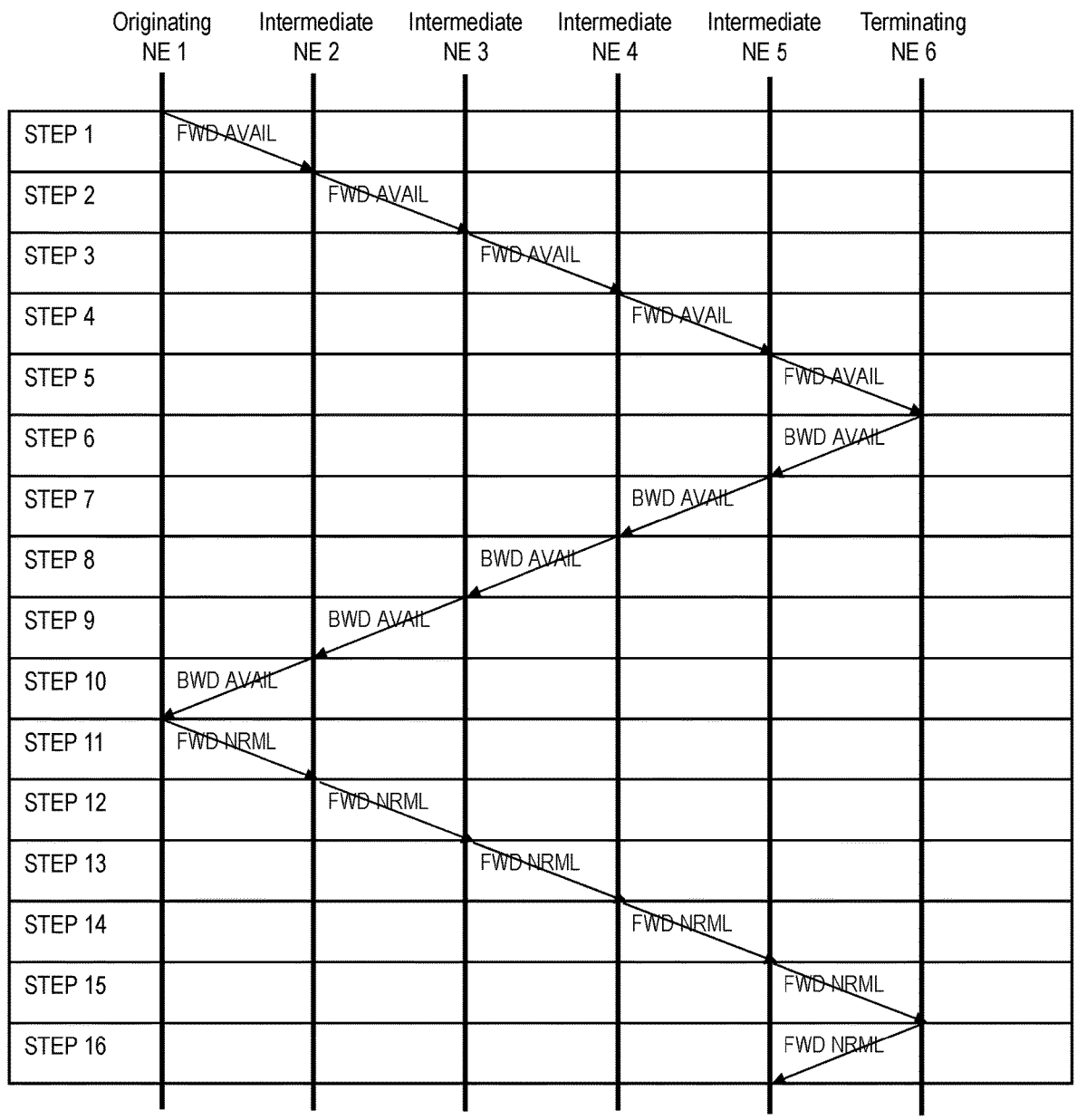

FIG. 23 is an example of the originating NE requesting available time slots. Only the originating NE can request available time slots (i.e., the bandwidth available by changing modulation). In Step 1, the originating NE Sends a CMD FWD AVAIL with Stat=OK, Sub-Channel(s), Time Slot(s). In Step 2-5, the intermediate NEs check SNR and if available time slots are less than received time slots, send AVAIL command with supported time slots, otherwise passes AVAIL command along with the same information. In Step 6, the terminating NE checks SNR and if available time slots are less than received time slots, generates FWD AVAIL command with supported time slots, otherwise generates FWD AVAIL command along with the same information. In Steps 7-10, the intermediate NEs pass the BWD command along noting available time slots. In Step 11, the originating node sends a normal command. In Steps 12-15, upon receiving the normal command, the intermediate NEs pass through the normal command. In Step 16, upon receiving the normal command, the terminating node generates a normal command.

The foregoing table illustrates stripping of time slots across the sub-channels for the transceiver 1100. In particular, each 100 Gbps of bandwidth uses a total of 80 time slots. The 80 time slots may be striped across all of the sub-channels.

| | BW Used | | | | | | | | | |
|---|---|---|---|---|---|---|---|---|---|---|
| | 100 G | 200 G | 300 G | 400 G | 500 G | 600 G | 700 G | 800 G | 900 G | 1 T |
| | | | | | Time slots per channel | | | | | |
| Channel | 8 | 16 | 24 | 32 | 40 | 48 | 56 | 64 | 72 | 80 |
| 1 | 1-8 | 1-16 | 1-24 | 1-32 | 1-40 | 1-48 | 1-56 | 1-64 | 1-72 | 1-80 |
| 2 | 81-88 | 81-96 | 81-104 | 81-112 | 81-120 | 81-128 | 81-136 | 81-144 | 81-152 | 81-160 |
| 3 | 161-168 | 161-176 | 161-184 | 161-192 | 161-200 | 161-208 | 161-216 | 161-224 | 161-232 | 161-240 |
| 4 | 241-248 | 241-256 | 241-264 | 241-272 | 241-280 | 241-288 | 241-296 | 241-304 | 241-312 | 241-320 |
| 5 | 321-328 | 321-336 | 321-344 | 321-352 | 321-360 | 321-368 | 321-376 | 321-384 | 321-392 | 321-400 |
| 6 | 401-408 | 401-416 | 401-424 | 401-432 | 401-440 | 401-448 | 401-456 | 401-464 | 401-472 | 401-480 |
| 7 | 481-488 | 481-496 | 481-504 | 481-512 | 481-520 | 481-528 | 481-536 | 481-544 | 481-552 | 481-560 |
| 8 | 561-568 | 561-576 | 561-584 | 561-592 | 561-600 | 561-608 | 561-616 | 561-624 | 561-632 | 561-640 |
| 9 | 641-648 | 641-656 | 641-664 | 641-672 | 641-680 | 641-688 | 641-696 | 641-704 | 641-712 | 641-720 |
| 10 | 721-728 | 721-736 | 721-744 | 721-752 | 721-760 | 721-768 | 721-776 | 721-784 | 721-792 | 721-800 |

Step 1, the intermediate NE 3 sends a command to decrement bandwidth (BWD DEC) with Stat=OK, Sub-Channel(s), Time Slot(s), etc. In Step 2, the intermediate NEs pass BWD command along noting that status is OK. In Step 3, the originating NE notes that the status is OK and generates an FWD command with the same information. In Steps 4-7, the intermediate NEs check SNR, verify decrement is OK and pass the FWD command along noting that status is OK. In Step 8, the terminating NE checks SNR, verifies decrement is OK and generates a BWD with the same information command along noting that status is OK. In Step 9-12, the intermediate NEs pass the BWD command along noting that status is OK. In Step 13, the originating NE generates a normal command and since the received DEC command status was OK, decrements times slots and adjusts modulation formats on addressed sub channels. In Steps 14-17, the intermediate NEs pass the normal command and since the received DEC command status was OK, decrement times slots and adjust modulation formats on addressed sub channels. In Step 18, the terminating node generates a With respect to the switch 1130 and/or the interface 1132 in the transceiver 1100, the transceiver 1100 may be used in a TDM device, a Packet device, or a combination thereof. In TDM-based core switches, a provisioned data rate must be maintained, within limits of the method of resizing line path bandwidth. The provisioning can be used to increase/decrease data rate to take advantage of SNR increase/decrease. In packet-based core switches, traffic flows are packetized. Note, any traffic type can be packetized (also known as Segmentation and Reassembly (SAR)). For example, Ethernet traffic can be encapsulated into switch packets, TDM traffic (SONET/SDH/OTN/etc.) can be "chopped up" and encapsulated into switch packets, etc. The packet switch routes switch packets between ports, and packet flows can easily be switched between sub channels on the transceiver 1100 to accommodate faults and bandwidth changes. Also, the packet flows can be concatenated across multiple transceivers 1100. Accommodating bandwidth changes and faults can be as simple as back pressure from the transceiver 1100 to the core switch or can use one of many bandwidth signaling approaches.

In an exemplary embodiment, the flexible bandwidth adaptation systems and methods can reduce power consumption using the adaptive modulation formats in links with varying traffic loads. An aspect of networks is that traffic loads statistically vary over time based on a plurality of factors (e.g., time, day, specific events, etc.). Conventionally, networks require that transport paths be outfitted with maximum data throughput 100% of the time even though it is required only at peak usage times. The flexible bandwidth adaptation systems and methods described herein are ideal for adapting the modulation format to match the current traffic load. This allows for a partial shutdown of the transceiver 1100 hardware for a given traffic load.

Figure 24A:
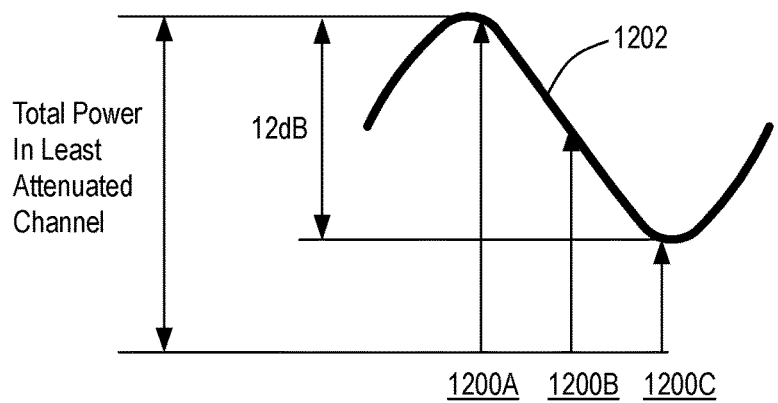
FIGS. 24A-24C are graphs of maximizing data throughput and reducing costs in the presence of power ripple.
Figure 24B:
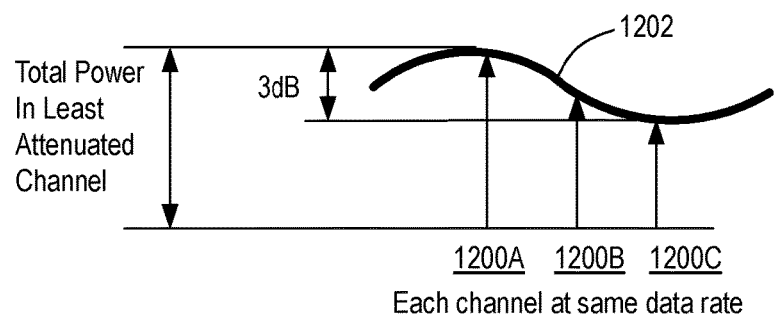
Figure 24C:
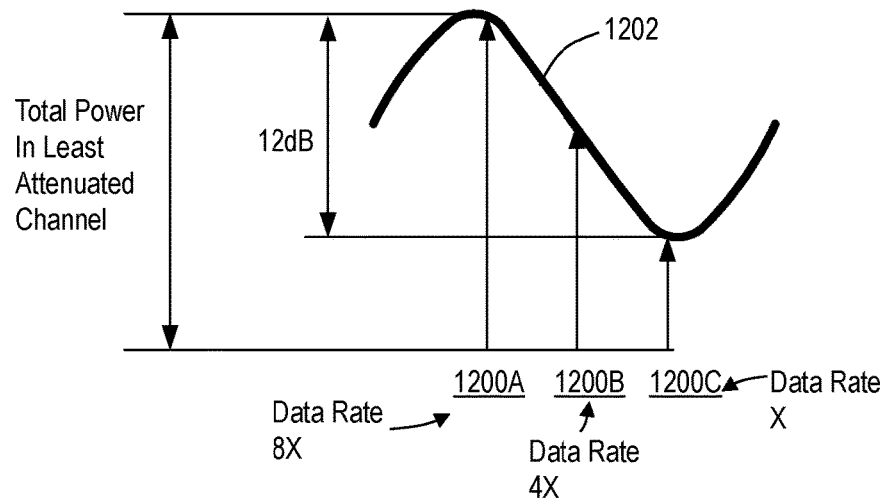
Figure 25:
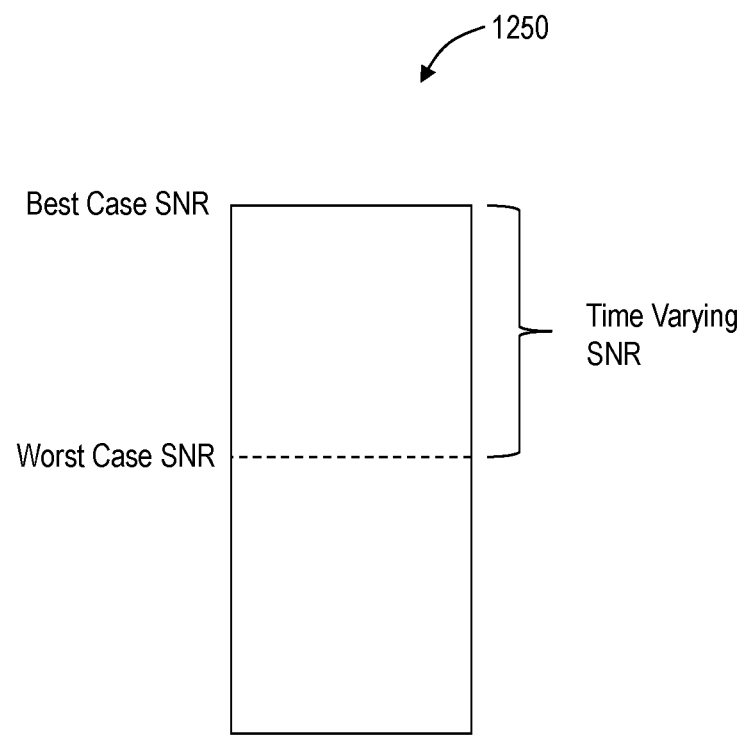
FIG. 25 is a graph of variance in SNR over time for a channel in accordance with the flexible bandwidth adaptation systems and methods.

Referring to FIGS. 24A-24C, in an exemplary embodiment, graphs illustrate maximizing data throughput and reducing costs in the presence of span ripple. In particular, the graphs include three signals 1200A, 1200B, 1200C graphed on a frequency versus power graph. As the signals 1200A, 1200B, 1200C travel over fiber plant, optical amplifiers, etc., the signals 1200A, 1200B, 1200C are attenuated differently based on frequency resulting in ripple and tilt. Note, the example of FIGS. 24A-24C illustrates ripple, but the same concepts apply to tilt. FIG. 24A illustrates uncorrected ripple 1202 and its effect on the power of the signals 1200A, 1200B, 1200C. Specifically, there is a 12 dB difference between the signal 1200A and the signal 1200C. Conventional ripple correction (FIG. 24B) includes a device in the span that attenuates all channels to match the worst attenuated channel, i.e. the signal 1200C. The extra loss reduces the signal power relative to noise in the span ultimately reducing SNR which limits reach and max data rate for the channel. Additional amplification is required to accommodate the extra loss of the ripple reducer, adding cost. The flexible bandwidth adaptation systems and methods can adapt data rates of each of the signals 1200A, 1200B, 1200C to the associated SNR thereby maximizing rate and reach. For example, high SNR channels can use higher data rate modulations formats, e.g. the signal 1200A, and the lower SNR channels can user lower data rate modulation formats, e.g. the signal 1200C. This also removes ripple reducing devices in the fiber plant which reduces costs.

Referring to FIG. 15, in an exemplary embodiment, a graph illustrates variance in SNR over time for a channel 1250. Of note, the channel 1250 when deployed will have SNR that varies over time based on various factors, e.g. daily temperature changes, mechanical vibration, etc. Conventional systems with fixed modulation formats require deployment based on a worst case SNR reducing reach, requiring extra equipment (amplifiers and regenerators), etc. The flexible bandwidth adaptation systems and methods can use the adapting modulation formats to maximize data rates as SNR varies allowing an effective throughput based on an average SNR (in lieu of a worst case SNR). Thus, the flexible bandwidth adaptation systems and methods advantageously increase data throughput for a given fiber plant and maximize reach without having to add amplifiers and regenerators.

Using the average SNR to drive data throughput allows greater oversubscription than worst case SNR. This may have an application with data services, such as Carrier Ethernet, for example. Carrier Ethernet may include Guaranteed throughput and Best Effort throughput. For Guaranteed throughput, a specific data throughput is guaranteed and is the last traffic to be dropped in the event of congestion. Bursts of traffic above that guaranteed rate may be dropped in case of congestion. This is usually a Business class of service. For Best Effort throughput, this is effective "No Effort" and is the first data to be dropped in the event of congestion. This takes advantage of unused bandwidth when higher priority traffic is not using its full bandwidth. This is usually a residential class of service. With conventional systems, the worst case SNR is used to determine bandwidth. For example, some portion of the bandwidth is dedicated to guaranteed services (e.g., 80%), and the remaining is divided among Burst traffic and Best effort traffic (e.g., 30%) for a total subscription of 110%. The flexible bandwidth adaptation systems and methods adapt to varying SNR to maximize BW bandwidth. For example, if SNR increases during the day, allotment could be 80% average for Guaranteed and 30% average for best effort.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method comprising:
   in one or more of a management system, a management plane, and a control plane associated with an optical network, monitoring one or more optical links each formed by optical transceivers which are configured to provide variable capacity via a plurality of modulation formats;
   based on the monitoring, causing corresponding optical transceivers for the one or more optical links to operate at a first modulation format, different from a second modulation format, providing excess capacity; and mapping the excess capacity to bandwidth useable by one or more services managed by the one or more of the management system, the management plane, and the control plane, wherein the second modulation format supports a nominally guaranteed rate over a corresponding optical link based on optical margin, and the first modulation format includes consumption of all or part of the optical margin.

2. The method of claim 1, further comprising advertising the bandwidth useable by the one or more services via the control plane.

3. The method of claim 1, wherein the bandwidth useable by the one or more services is allocated to one or more of one restoration bandwidth and short-lived bandwidth-on-demand connections.

4. The method of claim 1, further comprising detecting margin erosion of one of the corresponding optical transceivers; and adjusting the corresponding optical transceivers to operate at the second modulation format and removing the excess capacity.

5. The method of claim 1, wherein the causing includes coordinating the change from the second modulation format to the first modulation format with one or more network elements in a path over corresponding optical links.

6. The method of claim 1, wherein the plurality of modulation formats are discrete modulation levels which are adjusted to accommodate Signal-to-Noise (SNR) ratios on the corresponding optical links.

7. The method of claim 1, further comprising measuring and determining an average Signal-to-Noise (SNR) on the corresponding optical links and utilizing the average SNR to determine the first modulation format.

8. A controller comprising:

a network interface communicatively coupled to an optical network;

a processor communicatively coupled to the network interface; and memory storing instructions that, when executed, cause the processor to monitor one or more optical links in the optical network each formed by optical transceivers which are configured to provide variable capacity via a plurality of modulation formats, based on the monitor, cause corresponding optical transceivers for the one or more optical links to operate at a first modulation format, different from a second modulation, format providing excess capacity, and map the excess capacity to bandwidth useable by one or more services managed by the controller, wherein the second modulation format supports a nominally guaranteed rate over a corresponding optical link based on optical margin, and the first modulation format includes consumption of all or part of the optical margin.

9. The controller of claim 8, wherein the memory storing instructions that, when executed, further cause the processor to advertise the bandwidth useable by the one or more services via the control plane.

10. The controller of claim 8, wherein the bandwidth useable by the one or more services is allocated to one or more of one restoration bandwidth and short-lived bandwidth-on-demand connections.

11. The controller of claim 8, wherein the memory storing instructions that, when executed, further cause the processor to detect margin erosion of one of the corresponding optical transceivers; and adjust the corresponding optical transceivers to operate at the second modulation format and removing the excess capacity.

12. The controller of claim 8, wherein the memory storing instructions that, when executed, further cause the processor to coordinate the change from the second modulation format to the first modulation format with one or more network elements in a path over corresponding optical links.

13. The controller of claim 8, wherein the plurality of modulation formats are discrete modulation levels which are adjusted to accommodate Signal-to-Noise (SNR) ratios on the corresponding optical links.

14. The controller of claim 8, wherein the memory storing instructions that, when executed, further cause the processor to measure and determine an average Signal-to-Noise (SNR) on the corresponding optical links and utilize the average SNR to determine the first modulation format.

15. A controller comprising:

a network interface communicatively coupled to an optical network;

a processor communicatively coupled to the network interface; and memory storing instructions that, when executed, cause the processor to monitor one or more optical links in the optical network each formed by optical transceivers which are configured to provide variable capacity via a plurality of modulation formats, based on the monitor, cause corresponding optical transceivers for the one or more optical links to operate at a first modulation format, different from a second modulation format, providing excess capacity, measure and determine an average Signal-to-Noise (SNR) on the corresponding optical links and utilize the average SNR to determine the first modulation format, and map the excess capacity to bandwidth useable by one or more services managed by the controller.

16. The controller of claim 15, wherein the memory storing instructions that, when executed, further cause the processor to advertise the bandwidth useable by the one or more services via the control plane.

17. The controller of claim 15, wherein the bandwidth useable by the one or more services is allocated to one or more of one restoration bandwidth and short-lived bandwidth-on-demand connections.

18. The controller of claim 15, wherein the memory storing instructions that, when executed, further cause the processor to detect margin erosion of one of the corresponding optical transceivers; and adjust the corresponding optical transceivers to operate at the second modulation format and removing the excess capacity.

19. The controller of claim 15, wherein the memory storing instructions that, when executed, further cause the processor to
- coordinate the change from the second modulation format to the first modulation format with one or more network elements in a path over corresponding optical links.

20. The controller of claim 15, wherein the plurality of modulation formats are discrete modulation levels which are adjusted to accommodate Signal-to-Noise (SNR) ratios on the corresponding optical links.

* * * * *